(12) United States Patent
Sasaki et al.

(10) Patent No.: US 7,155,809 B2
(45) Date of Patent: Jan. 2, 2007

(54) METHOD OF MANUFACTURING THIN-FILM MAGNETIC HEAD

(75) Inventors: Yoshitaka Sasaki, Milpitas, CA (US); Hiroyuki Itoh, Milpitas, CA (US); Takehiro Kamigama, Hong Kong (HK)

(73) Assignees: Headway Technologies, Inc, Milpitas, CA (US); SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 11/401,955

(22) Filed: Apr. 12, 2006

(65) Prior Publication Data

US 2006/0191129 A1 Aug. 31, 2006

Related U.S. Application Data

(62) Division of application No. 10/702,512, filed on Nov. 7, 2003.

(51) Int. Cl.
*G11B 5/127* (2006.01)
*G11B 5/147* (2006.01)

(52) U.S. Cl. .............. 29/603.12; 29/603.13; 29/603.14; 29/603.15; 29/603.18; 29/603.23; 360/126

(58) Field of Classification Search ......... 29/603.12, 29/603.13, 603.14, 603.15, 603.18, 603.23; 360/126, 317, 122, 123, 125; 216/22, 63, 216/39, 49, 41
See application file for complete search history.

(56) References Cited

U.S. PATENT DOCUMENTS

| | | | |
|---|---|---|---|
| 5,793,578 A | 8/1998 | Heim et al. | |
| 6,043,959 A | 3/2000 | Crue et al. | |
| 6,043,960 A * | 3/2000 | Chang et al. | 360/317 |
| 6,069,775 A * | 5/2000 | Chang et al. | 360/126 |
| 6,151,193 A * | 11/2000 | Terunuma et al. | 360/126 |
| 6,163,436 A * | 12/2000 | Sasaki et al. | 360/126 |
| 6,259,583 B1 | 7/2001 | Fontana, Jr. et al. | |
| 6,400,525 B1 | 6/2002 | Sasaki et al. | |
| 6,560,068 B1 | 5/2003 | Sasaki | |

FOREIGN PATENT DOCUMENTS

JP    A 2001-52311    2/2001

* cited by examiner

*Primary Examiner*—A. Dexter Tugbang
*Assistant Examiner*—Tai Van Nguyen
(74) *Attorney, Agent, or Firm*—Oliff & Berridge, PLC

(57) ABSTRACT

A method of manufacturing a thin-film magnetic head comprises the steps of forming a first pole layer, forming a gap layer on a pole portion of the first pole layer, and forming a second pole layer on the gap layer. The second pole layer incorporates a first layer adjacent to the gap layer, and a second layer including a track width defining portion. The step of forming the second pole layer includes the steps of: forming a magnetic layer for forming the first layer on the gap layer; forming the second layer on the magnetic layer; and etching the magnetic layer to align with a width of the track width defining portion, so that the magnetic layer is formed into the first layer and the width of each of the first layer and the second layer taken in a medium facing surface is made equal to the track width.

23 Claims, 20 Drawing Sheets

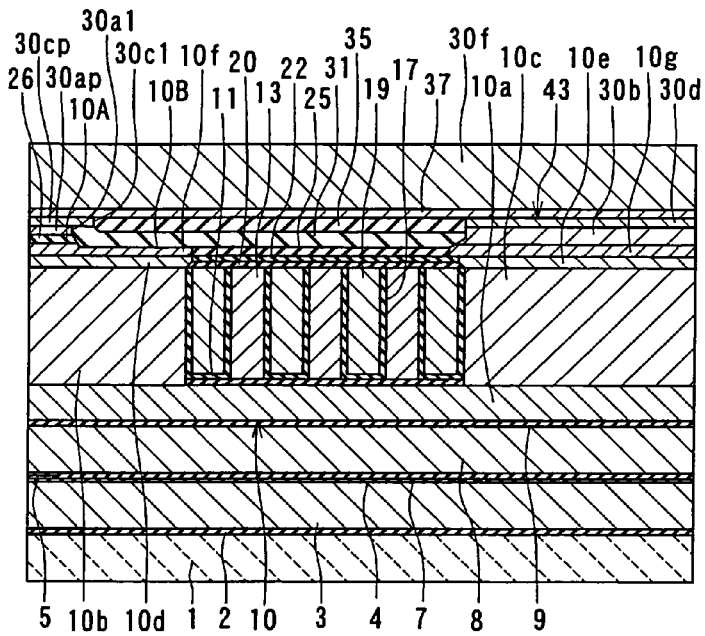
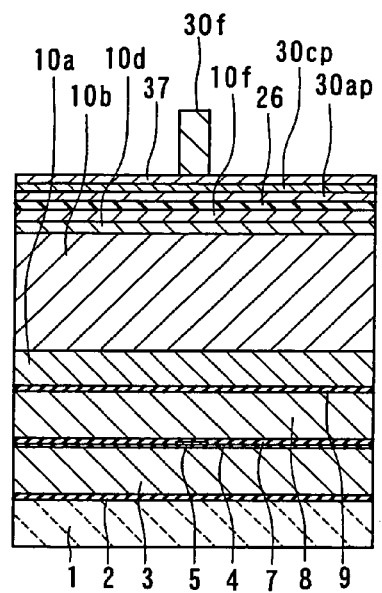
FIG. 15A       FIG. 15B
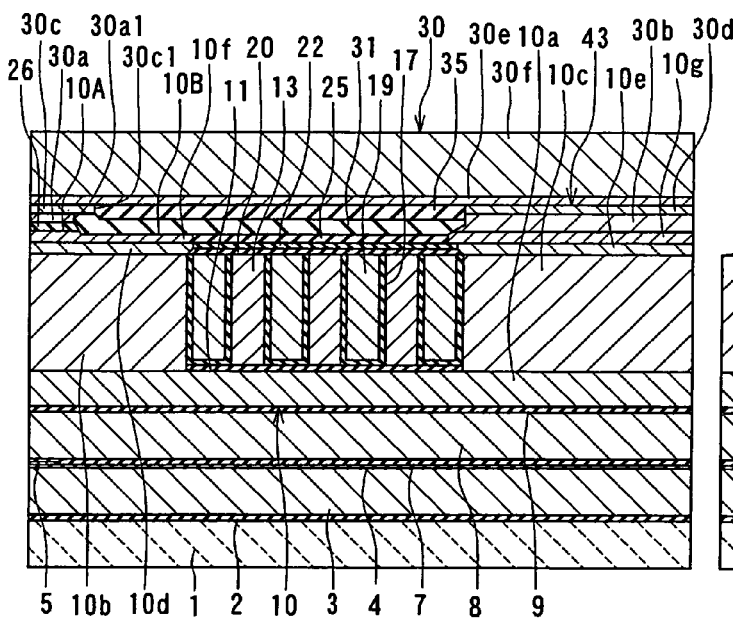
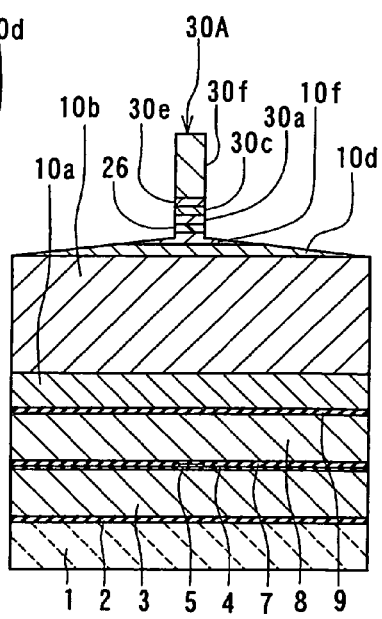
FIG. 16A       FIG. 16B

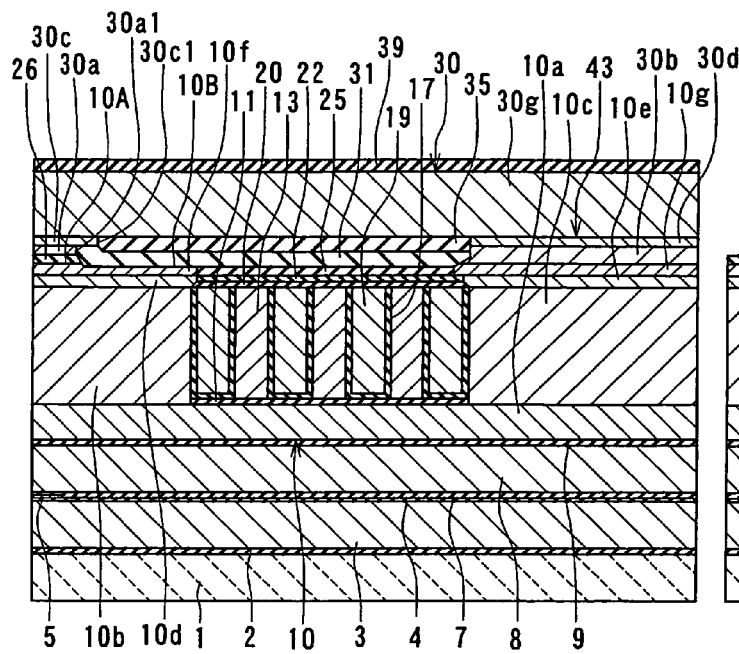
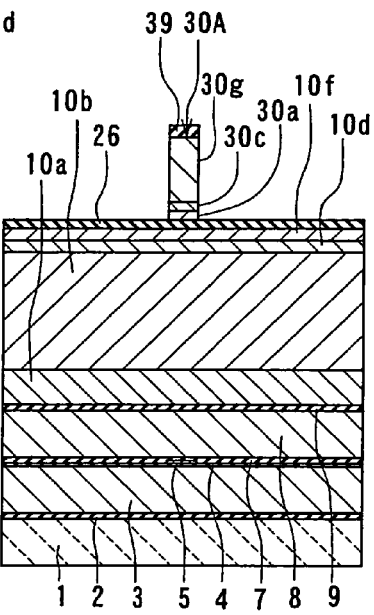
FIG. 20A
FIG. 20B
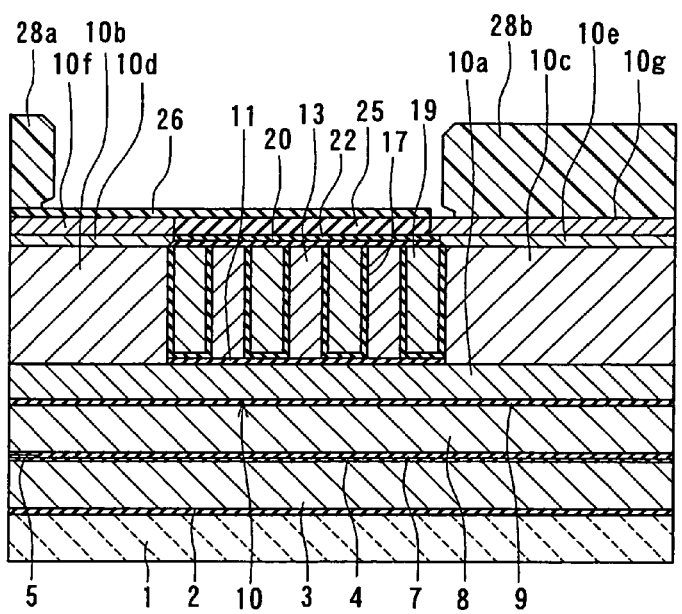
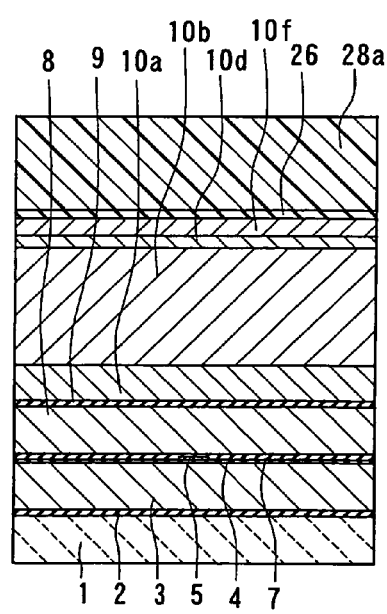
FIG. 21A
FIG. 21B

METHOD OF MANUFACTURING THIN-FILM MAGNETIC HEAD

This is a Divisional of application Ser. No. 10/702,512 filed Nov. 7, 2003. The entire disclosure of the prior application is hereby incorporated by reference herein in its entirety.

BACKGROUND OF THE INVENTION

1. Field of the Invention

The present invention relates to a thin-film magnetic head having at least an induction-type electromagnetic transducer and a method of manufacturing such a thin-film magnetic head.

2. Description of the Related Art

Recent years have seen significant improvements in the areal recording density of hard disk drives. In particular, areal recording densities of latest hard disk drives have reached 100 to 160 gigabytes per platter and are even exceeding that level. It is required to improve the performance of thin-film magnetic heads, accordingly.

Among the thin-film magnetic heads, widely used are composite thin-film magnetic heads made of a layered structure including a recording (write) head having an induction-type electromagnetic transducer for writing and a reproducing (read) head having a magnetoresistive element (that may be hereinafter called an MR element) for reading.

In general, the write head incorporates: a medium facing surface (an air bearing surface) that faces toward a recording medium; a bottom pole layer and a top pole layer that are magnetically coupled to each other and include magnetic pole portions opposed to each other and located in regions of the pole layers on a side of the medium facing surface; a write gap layer provided between the magnetic pole portions of the top and bottom pole layers; and a thin-film coil at least part of which is disposed between the top and bottom pole layers and insulated from the top and bottom pole layers.

Higher track densities on a recording medium are essential to enhancing the recording density among the performances of the write head. To achieve this, it is required to implement the write head of a narrow track structure in which the track width, that is, the width of the two magnetic pole portions opposed to each other with the write gap layer disposed in between, the width being taken in the medium facing surface, is reduced down to microns or the order of submicron. Semiconductor process techniques are utilized to achieve the write head having such a structure. In addition, many write heads have a trim structure to prevent an increase in the effective track width due to expansion of a magnetic flux generated in the pole portions in the medium facing surface. The trim structure is a configuration in which the pole portion of the top pole layer, the write gap layer and a portion of the bottom pole layer have the same width taken in the medium facing surface. This structure is formed by etching the write gap layer and the portion of the bottom pole layer, using the pole portion of the top pole layer as a mask.

One of the performance characteristics required for the write head is an excellent overwrite property that is one of the characteristics required for overwrite. To improve the overwrite property, it is required that as many magnetic lines of flux passing through the two pole layers as possible be introduced to the pole portions so as to generate a magnetic field as large as possible near the write gap layer in the medium facing surface. Therefore, to improve the overwrite property, it is effective to employ a material having a high saturation flux density for the magnetic material of the pole portions, and to reduce the throat height. The throat height is the length (height) of the pole portions, that is, the portions of the two pole layers opposed to each other with the write gap layer in between, as taken from the medium-facing-surface-side end to the other end. The zero throat height level is the level of the end (opposite to the medium facing surface) of the portions of the two pole layers opposed to each other with the write gap layer in between. To improve the overwrite property, it is also effective to increase the distance between the two pole layers in a region farther from the medium facing surface than the zero throat height level.

However, a problem arises if many lines of flux are introduced to the pole portions to improve the overwrite property. The problem is that lines of flux leak from portions in the medium facing surface other than the neighborhood of the write gap layer, and the flux leakage causes side write and side erase. Side write is that data is written in a track adjacent to the intended track. Side erase is that data written in a track adjacent to the intended track is erased. To reduce the occurrences of side write and side erase, it is effective to increase the difference in levels of the bottom pole layer in the trim structure, that is, the difference between the level of a portion of an end face of the bottom pole layer exposed in the medium facing surface, the portion touching the write gap layer, and the level of portions on both sides.

The throat height may be determined by forming a stepped portion in the bottom or top pole layer. Methods of determining the throat height by forming a stepped portion in the bottom pole layer are disclosed in, for example, the U.S. Pat. No. 6,259,583B1, the U.S. Pat. No. 6,400,525B1, and the U.S. Pat. No. 5,793,578. Methods of determining the throat height by forming a stepped portion in the top pole layer are disclosed in, for example, the U.S. Pat. No. 6,043,959 and the U.S. Pat. No. 6,560,068B1.

The following problem arises if the throat height is determined by forming a stepped portion in the bottom pole layer. To improve the overwrite property, it is effective to reduce the throat height and to increase the difference in levels in the bottom pole layer that determines the throat height. To reduce the occurrences of side write and side erase, it is effective to increase the difference in levels of the bottom pole layer in the trim structure. To achieve this, however, the volume of the portion of the bottom pole layer located between the side portions forming the trim structure is extremely reduced. At the same time, the cross-sectional area of the magnetic path abruptly decreases in the neighborhood of the boundary between the above-mentioned portion of the bottom pole layer and the other portions. As a result, the flux saturates in the neighborhood of the boundary and the overwrite property is reduced. Furthermore, the end face of the bottom pole layer exposed in the medium facing surface has a width that abruptly changes at the bottom of the stepped portion of the trim structure. Consequently, the flux leaks from the neighborhood of the bottom of the stepped portion of the trim structure toward the recording medium, which causes side write and side erase.

In the case in which the throat height is determined by forming a stepped portion in the top pole layer, too, a problem is that the overwrite property is reduced if the cross-sectional area of the magnetic path of the top pole layer abruptly decreases in the neighborhood of the medium facing surface.

The following problem also arises if the throat height is determined by forming a stepped portion in the top pole layer. In prior art the stepped portion of the top pole layer that determines the throat height is formed as follows. A pole portion layer that determines the throat height is first formed on the write gap layer. Next, an insulating layer is formed to cover the pole portion layer and the write gap layer. The insulating layer is polished so that the top surface of the pole portion layer is exposed. According to this method, the thickness of the pole portion layer varies, depending on the depth removed by the above-mentioned polishing. It is therefore difficult to precisely control the writing characteristics of the head if this method is employed.

OBJECT AND SUMMARY OF THE INVENTION

It is an object of the invention to provide a thin-film magnetic head and a method of manufacturing the same to reduce the occurrences of side write and side erase and to improve the overwrire property of the thin-film magnetic head.

A thin-film magnetic head of the invention comprises: a medium facing surface that faces toward a recording medium; a first pole layer and a second pole layer that are magnetically coupled to each other and include magnetic pole portions opposed to each other and located in regions of the pole layers on a side of the medium facing surface; a gap layer provided between the pole portion of the first pole layer and the pole portion of the second pole layer; and a thin-film coil, at least part of the coil being disposed between the first and second pole layers and insulated from the first and second pole layers. The first pole layer has a surface facing toward the gap layer, the surface incorporating a first surface including an end portion located in the medium facing surface and an end portion located opposite to the medium facing surface, and a second surface located away from the medium facing surface. The first surface is adjacent to the gap layer. A difference in level is created between the first surface and the second surface, so that the second surface is located farther from the second pole layer than the first surface. The second pole layer incorporates: a first layer disposed adjacent to the gap layer and including an end portion located in the medium facing surface and an end portion located opposite to the medium facing surface; and a second layer disposed on a side of the first layer opposite to the gap layer and including a track width defining portion for defining a track width. Each of the first layer and the second layer has a width taken in the medium facing surface that is equal to the track width. The length of the second layer is greater than the length of the first layer, each of the lengths being taken in a direction orthogonal to the medium facing surface.

According to the thin-film magnetic head of the invention, the first pole layer may include a portion adjacent to the gap layer, the portion having a width taken in the medium facing surface that is equal to the track width. The second layer may be a flat layer.

The thin-film magnetic head of the invention may further comprise an intermediate layer disposed between the first layer and the second layer. In this case, it is possible that the intermediate layer has a width taken in the medium facing surface that is equal to the track width, and the length of the intermediate layer taken in the direction orthogonal to the medium facing surface is greater than the length of the first layer and smaller than the length of the second layer. In this case, the throat height may be defined by the end portion of the first layer opposite to the medium facing surface.

According to the thin-film magnetic head of the invention, the throat height may be defined by the position in which the first layer is in contact with an end portion of the gap layer opposite to the medium facing surface.

According to the thin-film magnetic head of the invention, it is possible that the throat height is defined by the end portion of the first layer opposite to the medium facing surface and that the end portion of the first surface of the first pole layer opposite to the medium facing surface is located farther from the medium facing surface than the end portion of the first layer opposite to the medium facing surface.

A method of the invention for manufacturing a thin-film magnetic head is a method of manufacturing the thin-film magnetic head of the invention. The method comprises the steps of: forming the first pole layer; forming the thin-film coil on the first pole layer; forming the gap layer on the pole portion of the first pole layer; and forming the second pole layer on the gap layer.

The step of forming the second pole layer includes the steps of: forming a magnetic layer for forming the first layer on the gap layer; forming the second layer on the magnetic layer; and etching the magnetic layer to align with the width of the track width defining portion, so that the magnetic layer is formed into the first layer and that the width of each of the first layer and the second layer taken in the medium facing surface is made equal to the track width.

According to the method of manufacturing the thin-film magnetic head of the invention, the step of etching the magnetic layer may further include etching of the gap layer and a portion of the first pole layer to align with the width of the track width defining portion.

According to the method of the invention, the second layer may be made to be a flat layer.

According to the method of the invention, it is possible that the gap layer is made of a nonmagnetic inorganic material and that the first layer is etched by reactive ion etching in the step of etching the first layer. In this case, the nonmagnetic inorganic material may be one of the group consisting of alumina, silicon carbide and aluminum nitride.

According to the method of the invention, the second pole layer may further comprise an intermediate layer disposed between the first layer and the second layer. In this case, the intermediate layer may have a width taken in the medium facing surface that is equal to the track width, and may have a length taken in the direction orthogonal to the medium facing surface that is greater than the length of the first layer and smaller than the length of the second layer.

According to the method of the invention, the step of forming the second pole layer may include the steps of: forming a first magnetic layer for forming the first layer on the gap layer; forming a first mask on the first magnetic layer for forming an end portion of the first magnetic layer opposite to the medium facing surface; forming the end portion of the first magnetic layer and forming the first surface and the second surface of the first pole layer by selectively etching the first magnetic layer, the gap layer and the first pole layer through the use of the first mask; forming a first nonmagnetic layer so as to fill etched portions of the first magnetic layer, the gap layer and the first pole layer while the first mask is left unremoved; removing the first mask after the first nonmagnetic layer is formed; forming a second magnetic layer for forming the intermediate layer on the first magnetic layer and the first nonmagnetic layer after the first mask is removed; forming a second mask on the second magnetic layer for forming an end portion of the second magnetic layer opposite to the medium facing surface; forming the end portion of the second magnetic layer by selectively etching the second magnetic layer through the use of the second mask; forming a second nonmagnetic layer so as to fill an etched portion of the second magnetic layer while the second mask is left unremoved; removing the second mask after the second nonmagnetic layer is formed; forming the second layer on the second magnetic layer and the second nonmagnetic layer after the second mask is removed; and etching the second magnetic layer and the first magnetic layer to align with the width of the track width defining portion, so that the first magnetic layer is formed into the first layer, the second magnetic layer is formed into the intermediate layer, and the width of each of the first layer, the intermediate layer and the second layer that is taken in the medium facing surface is made equal to the track width.

In this case, the throat height may be defined by the end portion of the first layer opposite to the medium facing surface.

The step of forming the second pole layer may further include the step of flattening the top surfaces of the first magnetic layer and the first nonmagnetic layer by polishing, the step of flattening being provided between the step of removing the first mask and the step of forming the second magnetic layer. The depth to which the polishing is performed in the step of flattening the top surfaces of the first magnetic layer and the first nonmagnetic layer may fall within a range of 10 to 50 nm inclusive. The step of forming the second pole layer may further include the step of flattening the top surfaces of the second magnetic layer and the second nonmagnetic layer by polishing, the step of flattening being provided between the step of removing the second mask and the step of forming the second layer. The depth to which the polishing is performed in the step of flattening the top surfaces of the second magnetic layer and the second nonmagnetic layer may fall within a range of 10 to 50 nm inclusive.

According to the method of the invention, the step of forming the first pole layer may include the steps of: forming a first mask for forming the first surface and the second surface of the first pole layer on the gap layer; forming the first surface and the second surface by selectively etching the gap layer and a portion of the first pole layer through the use of the first mask; forming a first nonmagnetic layer so as to fill etched portions of the gap layer and the first pole layer while the first mask is left unremoved; and removing the first mask after the first nonmagnetic layer is formed.

In addition, the step of forming the second pole layer may include the steps of: forming a magnetic layer for forming the first layer on the gap layer and the first nonmagnetic layer after the first mask is removed; forming a second mask on the magnetic layer for forming an end portion of the magnetic layer opposite to the medium facing surface; forming the end portion of the magnetic layer by selectively etching the magnetic layer through the use of the second mask; forming a second nonmagnetic layer so as to fill an etched portion of the magnetic layer while the second mask is left unremoved; removing the second mask after the second nonmagnetic layer is formed; forming the second layer on the magnetic layer and the second nonmagnetic layer after the second mask is removed; and etching the magnetic layer to align with the width of the track width defining portion, so that the magnetic layer is formed into the first layer and that the width of each of the first layer and the second layer that is taken in the medium facing surface is made equal to the track width.

In this case, it is possible that an end portion of the gap layer opposite to the medium facing surface is formed by the etching of the gap layer and that the throat height is defined by a position in which the end portion of the gap layer is in contact with the first magnetic layer.

The step of forming the second pole layer may further include the step of flattening the top surface of the magnetic layer by polishing before the second mask is formed on the magnetic layer. The depth to which the polishing is performed in the step of flattening the top surface of the magnetic layer may fall within a range of 10 to 50 nm inclusive. The step of forming the second pole layer may further include the step of flattening the top surfaces of the magnetic layer and the second nonmagnetic layer by polishing, the step of flattening being provided between the step of removing the second mask and the step of forming the second layer. The depth to which the polishing is performed in the step of flattening the top surfaces of the magnetic layer and the second nonmagnetic layer may fall within a range of 10 to 50 nm inclusive.

According to the method of the invention, the step of forming the first pole layer may include the steps of: forming a first mask for forming the first surface and the second surface of the first pole layer on the first pole layer; forming the first surface and the second surface by selectively etching a portion of the first pole layer through the use of the first mask; forming a first nonmagnetic layer so as to fill an etched portion of the first pole layer while the first mask is left unremoved; and removing the first mask after the first nonmagnetic layer is formed. The step of forming the second pole layer may include the steps of: forming a magnetic layer for forming the first layer on the gap layer; forming a second mask on the magnetic layer for forming an end portion of the magnetic layer opposite to the medium facing surface; forming the end portion of the magnetic layer by selectively etching the magnetic layer through the use of the second mask; forming a second nonmagnetic layer so as to fill an etched portion of the magnetic layer while the second mask is left unremoved; removing the second mask after the second nonmagnetic layer is formed; forming the second layer on the magnetic layer and the second nonmagnetic layer after the second mask is removed; and etching the magnetic layer to align with the width of the track width defining portion, so that the magnetic layer is formed into the first layer and that the width of each of the first layer and the second layer that is taken in the medium facing surface is made equal to the track width.

In this case, it is possible that the throat height is defined by the end portion of the first layer opposite to the medium facing surface and that the end portion of the first surface of the first pole layer opposite to the medium facing surface is located farther from the medium facing surface than the end portion of the first layer opposite to the medium facing surface.

The step of forming the first pole layer may further include the step of flattening the top surfaces of the first pole layer and the first nonmagnetic layer by polishing after the first mask is removed. The depth to which the polishing is performed in the step of flattening the top surfaces of the first pole layer and the first nonmagnetic layer may fall within a range of 10 to 50 nm inclusive. The step of forming the second pole layer may further include the step of flattening the top surfaces of the magnetic layer and the second nonmagnetic layer by polishing, the step of flattening being provided between the step of removing the second mask and the step of forming the second layer. The depth to which the polishing is performed in the step of flattening the top surfaces of the magnetic layer and the second nonmagnetic layer may fall within a range of 10 to 50 nm inclusive.

According to the invention, the cross-sectional area of each of the magnetic path of the first pole layer and the magnetic path of the second pole layer gradually changes in the neighborhood of the medium facing surface. Therefore, according to the invention, the overwrite property of the thin-film magnetic head is improved while the occurrences of side write and side erase are suppressed.

Other and further objects, features and advantages of the invention will appear more fully from the following description.

BRIEF DESCRIPTION OF THE DRAWINGS

FIG. 15A and FIG. 15B are cross-sectional views for illustrating a step that follows FIG. 14A and FIG. 14B.

FIG. 16A and FIG. 16B are cross-sectional views for illustrating a step that follows FIG. 15A and FIG. 15B.

FIG. 20A and FIG. 20B are cross-sectional views for illustrating a step in a modification example of the method of manufacturing the thin-film magnetic head of the first embodiment.

FIG. 21A and FIG. 21B are cross-sectional views for illustrating a step in a method of manufacturing a thin-film magnetic head of a second embodiment of the invention.

DETAILED DESCRIPTION OF THE PREFERRED EMBODIMENTS

Embodiments of the invention will now be described in detail with reference to the accompanying drawings.

(First Embodiment)

Figure 18:
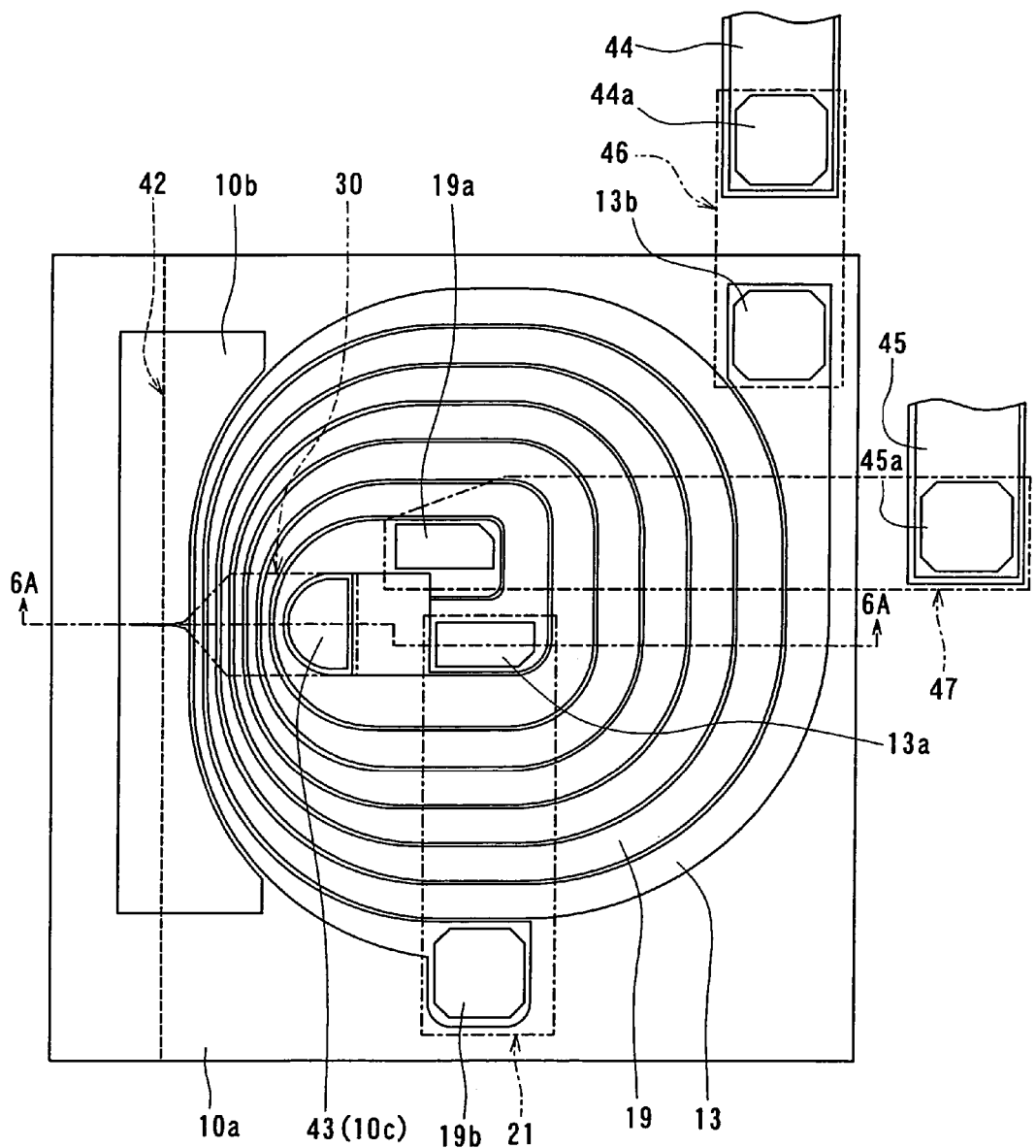
FIG. 18 is a plan view for illustrating the shape and arrangement of the thin-film coil of the thin-film magnetic head of the first embodiment of the invention.
Figure 19:
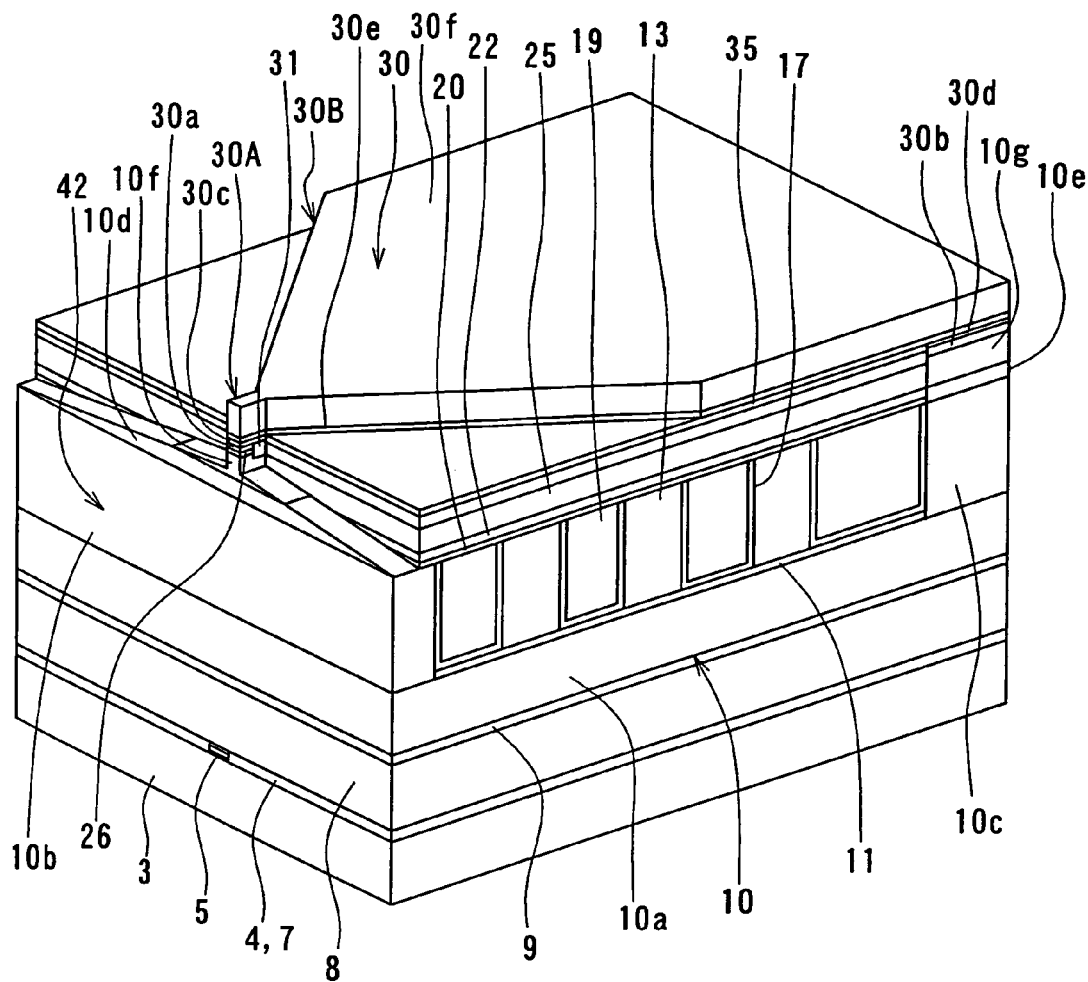
FIG. 19 is a perspective view for illustrating the configuration of the thin-film magnetic head of the first embodiment.

Reference is now made to FIG. 1A to FIG. 17A, FIG. 1B to FIG. 17B, FIG. 18 and FIG. 19 to describe a method of manufacturing a thin-film magnetic head of a first embodiment of the invention. FIG. 1A to FIG. 17A are cross sections orthogonal to the air bearing surface and the top surface of a substrate. FIG. 1B to FIG. 17B are cross sections of magnetic pole portions each of which is parallel to the air bearing surface. FIG. 18 is a plan view showing the shape and arrangement of a thin-film coil of the thin-film magnetic head of the embodiment. FIG. 19 is a perspective view for illustrating the configuration of the thin-film magnetic head in which an overcoat layer is omitted.

Figures 1A, 1B:
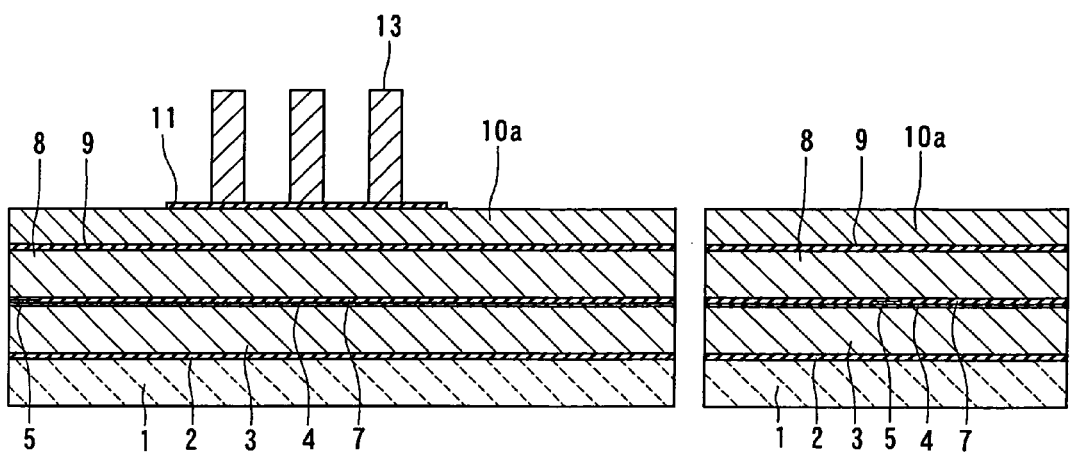
FIG. 1A and FIG. 1B are cross-sectional views for illustrating a step in a method of manufacturing a thin-film magnetic head of a first embodiment of the invention.

In the method of manufacturing the thin-film magnetic head of the embodiment, a step shown in FIG. 1A and FIG. 1B is first performed. In the step an insulating layer 2 made of alumina ($Al_2O_3$), for example, is deposited to a thickness of approximately 1 to 3 µm on a substrate 1 made of aluminum oxide and titanium carbide ($Al_2O_3$—TiC), for example. Next, a bottom shield layer 3 for a read head, made of a magnetic material such as Permalloy and having a thickness of approximately 2 to 3 µm, is formed on the insulating layer 2. The bottom shield layer 3 is selectively formed on the insulating layer 2 by plating through the use of a photoresist film as a mask, for example. Although not shown, an insulating layer that is made of alumina, for example, and has a thickness of 3 to 4 µm, for example, is formed over the entire surface. The insulating layer is then polished by chemical mechanical polishing (hereinafter referred to as CMP), for example, to expose the bottom shield layer 3 and to flatten the surface.

On the bottom shield layer 3, a bottom shield gap film 4 serving as an insulating film and having a thickness of approximately 20 to 40 nm, for example, is formed. On the bottom shield gap film 4, an MR element 5 for magnetic signal detection having a thickness of tens of nanometers is formed. For example, the MR element 5 may be formed by selectively etching an MR film formed by sputtering. The MR element 5 is located near a region in which the air bearing surface described later is to be formed. The MR element 5 may be an element made up of a magnetosensitive film that exhibits magnetoresistivity, such as an AMR element, a GMR element or a TMR (tunnel magnetoresistive) element. Next, although not shown, a pair of electrode layers, each having a thickness of tens of nanometers, to be electrically connected to the MR element 5 are formed on the bottom shield gap film 4. A top shield gap film 7 serving as an insulating film and having a thickness of approximately 20 to 40 nm, for example, is formed on the bottom shield gap film 4 and the MR element 5. The MR element 5 is embedded in the shield gap films 4 and 7. Examples of insulating materials used for the shield gap films 4 and 7 include alumina, aluminum nitride, and diamond-like carbon (DLC). The shield gap films 4 and 7 may be formed by sputtering or chemical vapor deposition (hereinafter referred to as CVD).

Next, a top shield layer 8 for a read head, made of a magnetic material and having a thickness of approximately 1.0 to 1.5 µm, is selectively formed on the top shield gap film 7. Next, although not shown, an insulating layer made of alumina, for example, and having a thickness of 2 to 3 µm, for example, is formed over the entire surface, and polished by CMP, for example, so that the top shield layer 8 is exposed, and the surface is flattened.

An insulating layer 9 made of alumina, for example, and having a thickness of approximately 0.3 µm, for example, is formed over the entire top surface of the layered structure obtained through the foregoing steps. On the entire top surface of the insulating layer 9, a first layer 10*a* of the bottom pole layer 10 made of a magnetic material and having a thickness of approximately 0.5 to 1.0 µm is formed. The first layer 10*a* has a top surface that is flat throughout. The bottom pole layer 10 includes the first layer 10*a*, and a second layer 10*b*, a third layer 10*d*, a fourth layer 10*f*, and coupling layers 10*c*, 10*e* and 10*g* that will be described later.

The first layer 10*a* may be formed by plating, using NiFe (80 weight % Ni and 20 weight % Fe), or a high saturation flux density material such as NiFe (45 weight % Ni and 55 weight % Fe), CoNiFe (10 weight % Co, 20 weight % Ni and 70 weight % Fe), or FeCo (67 weight % Fe and 33 weight % Co). Alternatively, the first layer 10*a* may be formed by sputtering, using a high saturation flux density material such as CoFeN, FeAlN, FeN, FeCo, or FeZrN. In this embodiment the first layer 10*a* is formed by sputtering to have a thickness of 0.5 to 1.0 µm by way of example.

Next, an insulating film 11 made of alumina, for example, and having a thickness of 0.2 µm, for example, is formed on the first layer 10*a*. The insulating film 11 is then selectively etched to form openings in the insulating film 11 in regions in which the second layer 10*b* and the coupling layer 10*c* are to be formed.

Next, although not shown, an electrode film of a conductive material having a thickness of 50 to 80 nm is formed by sputtering, for example, so as to cover the first layer 10*a* and the insulating film 11. This electrode film functions as an electrode and a seed layer for plating. Next, although not shown, a frame is formed on the electrode film by photolithography. The frame will be used for forming a first coil 13 by plating.

Next, electroplating is performed, using the electrode film, to form the first coil 13 made of a metal such as copper (Cu) and having a thickness of approximately 3.0 to 3.5 µm. The first coil 13 is disposed in the region in which the insulating film 11 is located. Next, the frame is removed, and portions of the electrode film except the portion below the first coil 13 are then removed by ion beam etching, for example.

Next, although not shown, a frame is formed on the first layer 10*a* and the insulating film 11 by photolithography. The frame will be used for forming the second layer 10*b* and the coupling layer 10*c* of the bottom pole layer 10 by frame plating.

Figures 2A, 2B:
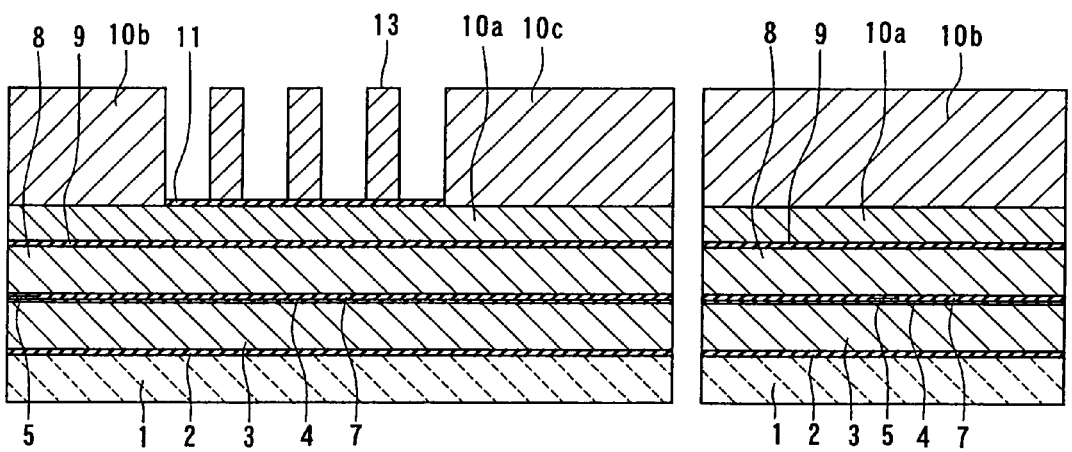
FIG. 2A and FIG. 2B are cross-sectional views for illustrating a step that follows FIG. 1A and FIG. 1B.

FIG. 2A and FIG. 2B illustrate the following step. In the step electroplating is performed to form the second layer 10*b* and the coupling layer 10*c*, each of which is made of a magnetic material and has a thickness of 3.5 to 4.0 µm, for example, on the first layer 10*a*. For example, the second layer 10*b* and the coupling layer 10*c* may be made of NiFe, CoNiFe or FeCo. In the present embodiment the second layer 10*b* and the coupling layer 10*c* are made of CoNiFe having a saturation flux density of 1.9 to 2.3 tesla (T) by way of example. In the embodiment, when the second layer 10*b* and the coupling layer 10*c* are formed by plating, no specific electrode film is provided, but the unpatterned first layer 10*a* is used as an electrode and a seed layer for plating.

Next, although not shown, a photoresist layer is formed to cover the first coil 13, the second layer 10*b* and the coupling layer 10*c*. Using the photoresist layer as a mask, the first layer 10*a* is selectively etched by reactive ion etching or ion beam etching, for example. The first layer 10*a* is thus patterned. Next, the photoresist layer is removed.

Figures 3A, 3B:
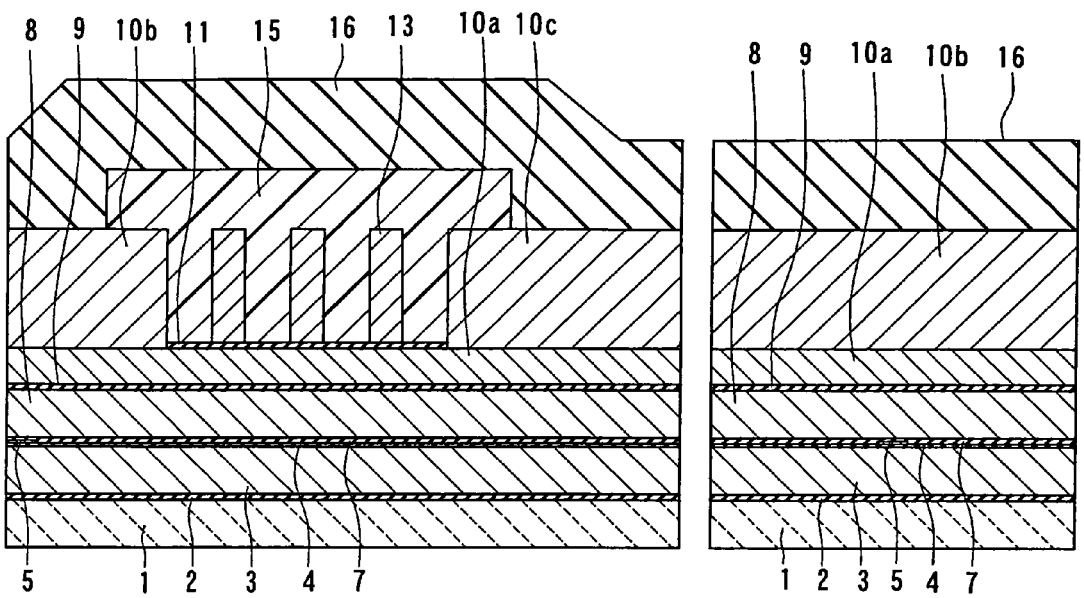
FIG. 3A and FIG. 3B are cross-sectional views for illustrating a step that follows FIG. 2A and FIG. 2B.

FIG. 3A and FIG. 3B illustrate the following step. In the step an insulating layer 15 made of photoresist, for example, is formed in a region in which a second coil 19 described later is to be located. The insulating layer 15 is formed so that at least the space between the second layer 10*b* and the first coil 13, the space between the turns of the first coil 13, and the space between the coupling layer 10*c* and the first coil 13 are filled with the insulating layer 15. Next, an insulating layer 16 made of alumina, for example, and having a thickness of 4 to 6 µm is formed so as to cover the insulating layer 15.

Figures 4A, 4B:
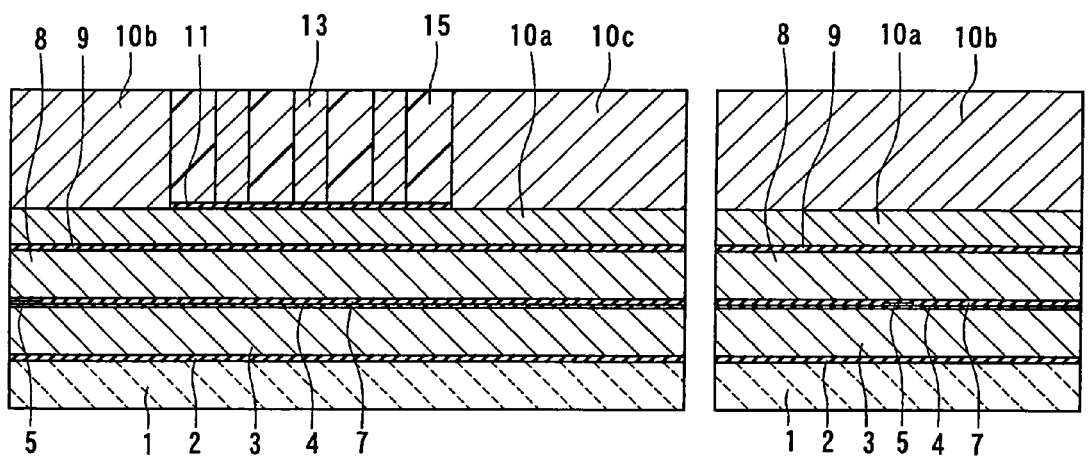
FIG. 4A and FIG. 4B are cross-sectional views for illustrating a step that follows FIG. 3A and FIG. 3B.

FIG. 4A and FIG. 4B illustrate the following step. In the step the 10*b* and the first coil 13, the groove between the turns of the first coil 13, and the groove between the coupling layer 10*c* and the first coil 13, but is intended to cover the grooves, taking advantage of good step coverage of CVD. The first and second conductive films in combination are called an electrode film. The electrode film functions as an electrode and a seed layer for plating. Next, on the electrode film, a conductive layer 19*p* made of a metal such as Cu and having a thickness of 3 to 4 µm, for example, is formed by plating. The electrode film and the conductive layer 19*p* are used for making the second coil 19. The conductive layer 19*p* of Cu is formed through plating on the second conductive film of Cu formed by CVD, so that the second coil 19 is properly formed in the space between the second layer 10*b* and the first coil 13, the space between the turns of the first coil 13, and the space between the coupling layer 10*c* and the first coil 13.

Figures 6A, 6B:
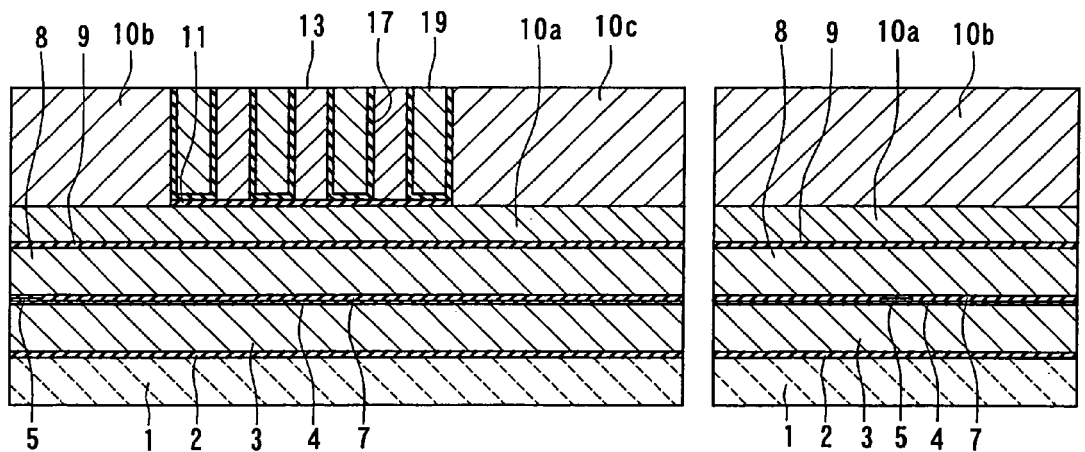
FIG. 6A and FIG. 6B are cross-sectional views for illustrating a step that follows FIG. 5A and FIG. 5B.

FIG. 6A and FIG. 6B illustrate the following step. In the step the conductive layer 19*p* is polished by CMP, for example, so that the second layer 10*b*, the coupling layer 10*c*, and the first coil 13 are exposed. As a result, the second coil 19 is made up of the conductive layer 19*p* and the electrode film that remain in the space between the second layer 10*b* and the first coil 13, the space between the turns of the first coil 13, and the space between the coupling layer 10*c* and the first coil 13. The above-mentioned polishing is performed such that each of the second layer 10*b*, the coupling layer 10*c*, the first coil 13 and the second coil 19 has a thickness of 2.0 to 3.0 µm, for example. The second coil 19 has turns at least part of which is disposed between turns of the first coil 13. The second coil 19 is formed such that only the insulating film 17 is provided between the turns of the first coil 13 and the turns of the second coil 19.

FIG. 18 illustrates the first coil 13 and the second coil 19. FIG. 6A is a cross section taken along line 6A—6A of FIG. 18. Connecting layers 21, 46 and 47, the top pole layer 30 and the air bearing surface 42 that will be formed later are shown in FIG. 18, too. As shown in FIG. 18, a connecting portion 13a is provided near an inner end of the first coil 13. A connecting portion 13b is provided near an outer end of the first coil 13. A connecting portion 19a is provided near an inner end of the second coil 19. A connecting portion 19b is provided near an outer end of the second coil 19.

In the step of forming the first coil 13 or the step of forming the second coil 19, two lead layers 44 and 45 are formed to be disposed outside the first layer 10a of the bottom pole layer 10, as shown in FIG. 18. The lead layers 44 and 45 have connecting portions 44a and 45a, respectively.

The connecting portions 13a and 19b are connected to each other through a connecting layer 21 that will be formed later. The connecting portions 44a and 13b are connected to each other through a connecting layer 46 that will be formed later. The connecting portions 19a and 45a are connected to each other through a connecting layer 47 that will be formed later.

Figures 7A, 7B:
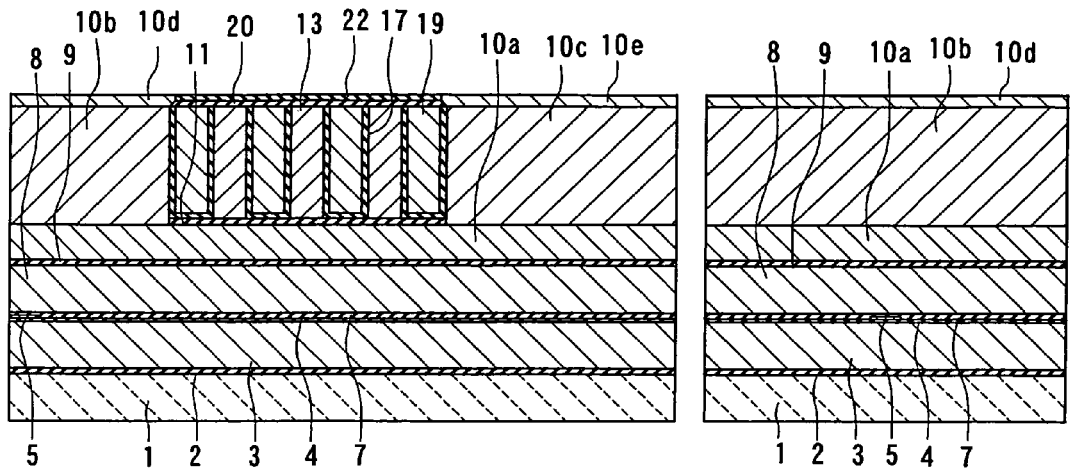
FIG. 7A and FIG. 7B are cross-sectional views for illustrating a step that follows FIG. 6A and FIG. 6B.

FIG. 7A and FIG. 7B illustrate the following step. In the step an insulating film 20 made of alumina, for example, and having a thickness of 0.1 to 0.3 μm is formed to cover the entire top surface of the layered structure. Etching is selectively performed on the insulating film 20 in the portions corresponding to the second layer 10b, the coupling layer 10c, the two connecting portions 13a and 13b of the first coil 13, the two connecting portions 19a and 19b of the second coil 19, the connecting portion 44a of the lead layer 44, and the connecting portion 45a of the lead layer 45. The insulating film 20 thus etched covers the top surfaces of the coils 13 and 19 except the two connecting portions 13a and 13b of the first coil 13 and the two connecting portions 19a and 19b of the second coil 19.

Next, the connecting layers 21, 46 and 47 of FIG. 18 are formed by frame plating, for example. The connecting layers 21, 46 and 47 are made of a metal such as Cu and each have a thickness of 0.8 to 1.5 μm, for example.

Next, a third layer 10d is formed on the second layer 10b, and a coupling layer 10e is formed on the coupling layer 10c each by frame plating, for example. The third layer 10d and the coupling layer 10e may be made of NiFe, CoNiFe or FeCo, for example. In the embodiment the third layer 10d and the coupling layer 10e are made of CoNiFe having a saturation flux density of 1.9 to 2.3 T by way of example. The third layer 10d and the coupling layer 10e each have a thickness of 0.8 to 1.5 μm, for example.

Next, an insulating film 22 made of alumina, for example, and having a thickness of 1 to 2 μm is formed to cover the entire top surface of the layered structure. The insulating film 22 is then polished by CMP, for example. This polishing is performed such that the top surfaces of the third layer 10d, the coupling layer 10e, the connecting layers 21, 46 and 47, and the insulating film 22 are flattened and each of these layers has a thickness of 0.3 to 1.0 μm.

Next, although not shown, a magnetic layer made of a magnetic material and having a thickness of 0.3 to 0.5 μm is formed by sputtering, so as to cover the entire top surface of the layered structure. The magnetic layer may be made of a high saturation flux density material such as CoFeN, FeAlN, FeN, FeCo, or FeZrN. In the embodiment the magnetic layer is made of CoFeN having a saturation flux density of 2.4 T by way of example.

Figures 8A, 8B:
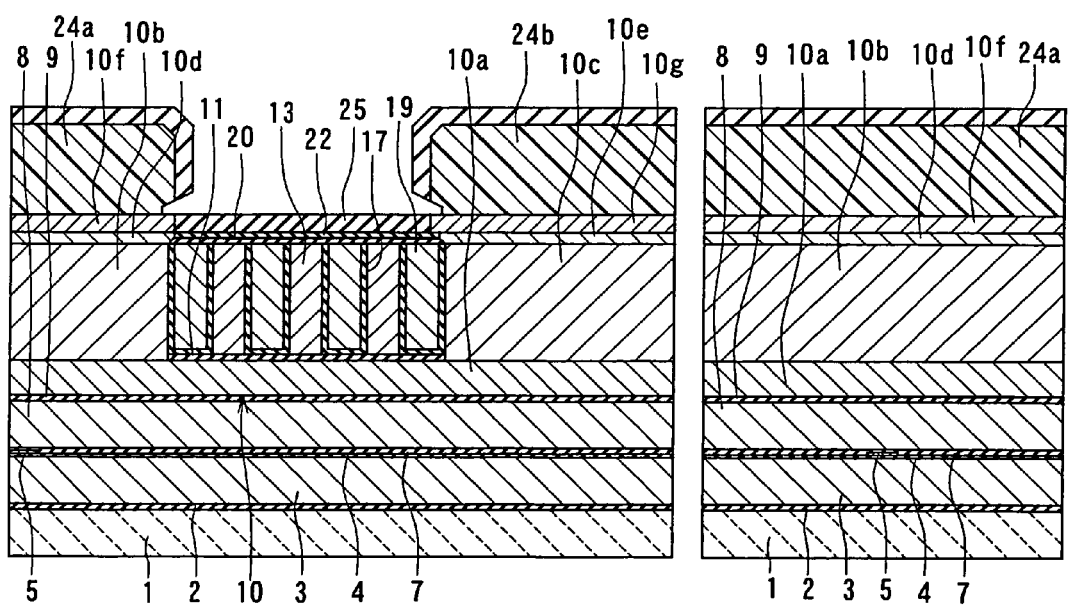
FIG. 8A and FIG. 8B are cross-sectional views for illustrating a step that follows FIG. 7A and FIG. 7B.

FIG. 8A and FIG. 8B illustrate the following step. In the step, on the magnetic layer, an etching mask 24a is formed in the portion corresponding to the third layer 10d, and an etching mask 24b is formed in the portion corresponding to the coupling layer 10e. Each of the etching masks 24a and 24b has an undercut so that the bottom surface is smaller than the top surface in order to facilitate lift-off that will be performed later. Such etching masks 24a and 24b may be formed by patterning a resist layer made up of two stacked organic films, for example.

Next, the magnetic layer is selectively etched by ion beam etching, for example, through the use of the etching masks 24a and 24b. The fourth layer 10f and the coupling layer 10g are thereby formed on the third layer 10d and the coupling layer 10e, respectively. The fourth layer 10f and the coupling layer 10g are made up of portions of the magnetic layer remaining under the etching masks 24a and 24b after the etching. This etching is performed such that the direction in which ion beams move forms an angle in a range of 0 to 20 degrees inclusive with respect to the direction orthogonal to the top surface of the first layer 10a. Next, to remove deposits on the sidewalls of the magnetic layer 23 after the etching, another etching is performed such that the direction in which ion beams move forms an angle in a range of 60 to 75 degrees inclusive with respect to the direction orthogonal to the top surface of the first layer 10a.

Next, an insulating layer 25 made of alumina, for example, and having a thickness of 0.4 to 0.6 μm is formed so as to cover the entire top surface of the layered structure while the etching masks 24a and 24b are left unremoved. The insulating layer 25 is formed in a self-aligned manner so as to fill the etched portion of the above-mentioned magnetic layer. The etching insulating layers 15 and 16 are polished by CMP, for example, so that the second layer 10b, the coupling layer 10c and the insulating layer 15 are exposed, and the top surfaces of the second layer 10b, the coupling layer 10c and the insulating layers 15 and 16 (which is not shown in FIG. 4A and FIG. 4B) are flattened.

Figures 5A, 5B:
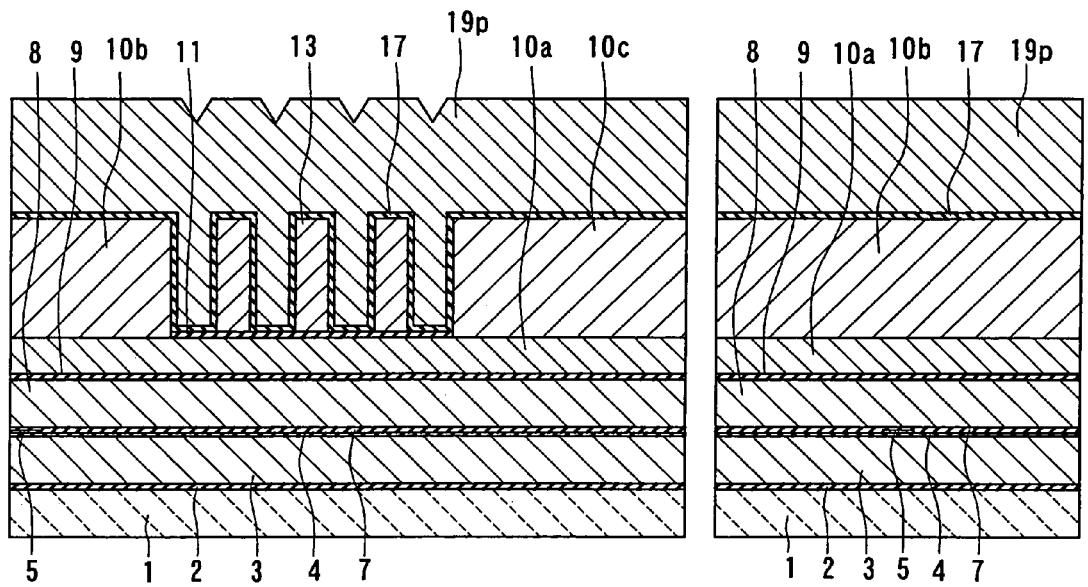
FIG. 5A and FIG. 5B are cross-sectional views for illustrating a step that follows FIG. 4A and FIG. 4B.

FIG. 5A and FIG. 5B illustrate the following step. In the step the insulating layer 15 is removed, and an insulating film 17 made of alumina, for example, is then formed by CVD, for example, so as to cover the entire top surface of the layered structure. As a result, grooves covered with the insulating film 17 are formed in the space between the second layer 10b and the first coil 13, the space between the turns of the first coil 13, and the space between the coupling layer 10c and the first coil 13. The insulating film 17 has a thickness of 0.08 to 0.15 μm, for example. The insulating film 17 may be formed by CVD, for example, wherein a gas of $H_2O$, $N_2O$, $H_2O_2$ or $O_3$ (ozone) as a material used for making thin films and $Al(CH_3)_3$ or $AlCl_3$ as a material used for making thin films are alternately ejected in an intermittent manner under a reduced pressure at a temperature of 180 to 220° C. Through this method, a plurality of thin alumina films are stacked so that the insulating film 17 that is closely-packed and exhibits a good step coverage, and has a desired thickness is formed.

Next, a first conductive film made of Cu, for example, and having a thickness of 50 nm, for example, is formed by sputtering so as to cover the entire top surface of the layered structure. On the first conductive film, a second conductive film made of Cu, for example, and having a thickness of 50 nm, for example, is formed by CVD. The second conductive film is not intended to be used for entirely filling the groove between the second layer masks 24a and 24b are then lifted off. Next, CMP is performed for a short period of time, for example, to polish and flatten the top surfaces of the fourth layer 10f, the coupling layer 10g and the insulating layer 25. This flattening removes small differences in levels between the fourth layer 10f and the insulating layer 25, and between the coupling layer 10g and the insulating layer 25, and removes remainders and burrs of the etching masks 24a and 24b after lift-off is performed.

Figures 9A, 9B:
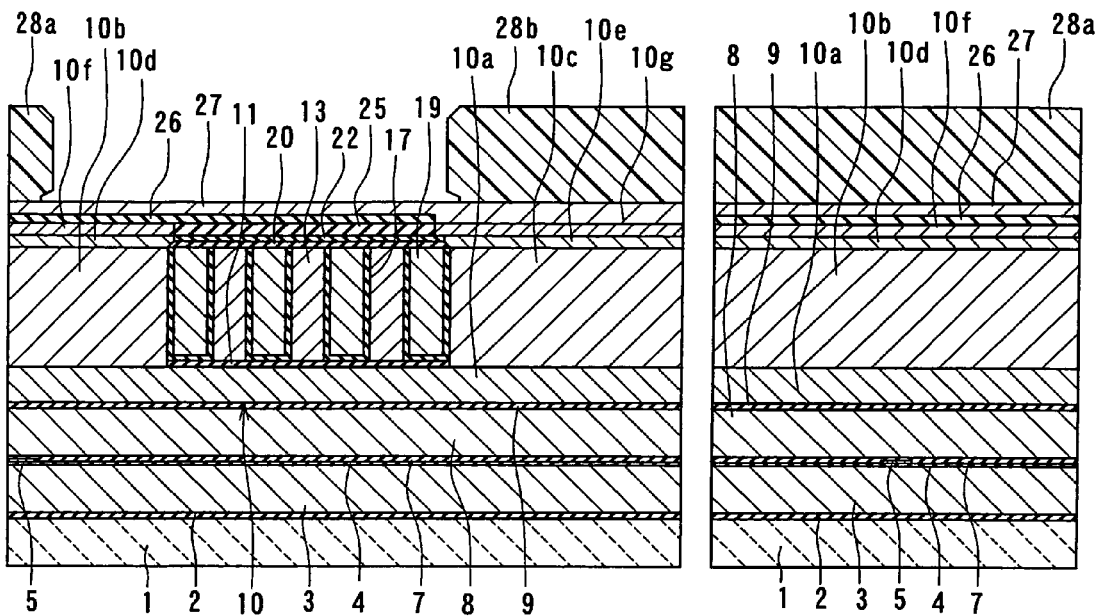
FIG. 9A and FIG. 9B are cross-sectional views for illustrating a step that follows FIG. 8A and FIG. 8B.

FIG. 9A and FIG. 9B illustrate the following step. In the step a write gap layer 26 having a thickness of 0.07 to 0.1 µm is formed to cover the entire top surface of the layered structure. The write gap layer 26 may be made of an insulating material such as alumina or a nonmagnetic metal material such as Ru, NiCu, Ta, W or NiB. Next, a portion of the write gap layer 26 corresponding to the coupling layer 10g is selectively etched.

Next, a first magnetic layer 27 made of a magnetic material and having a thickness of 0.1 to 0.3 µm is formed by sputtering, for example, so as to cover the entire top surface of the layered structure. The magnetic layer 27 may be made of a high saturation flux density material such as CoFeN, FeAlN, FeN, FeCo or FeZrN. The magnetic layer 27 preferably has a higher flux density. In the embodiment the magnetic layer 27 is made of CoFeN having a saturation flux density of 2.4 T by way of example.

Next, etching masks 28a and 28b are formed on the magnetic layer 27. The etching mask 28a is provided for forming an end portion for defining the throat height in the magnetic layer 27, and is disposed above the fourth layer 10f. The etching mask 28b is disposed above the coupling layer 10g. Each of the etching masks 28a and 28b has an undercut so that the bottom surface is smaller than the top surface in order to facilitate lift-off that will be performed later. Such etching masks 28a and 28b may be formed by patterning a resist layer made up of two stacked organic films, for example.

Figures 10A, 10B:
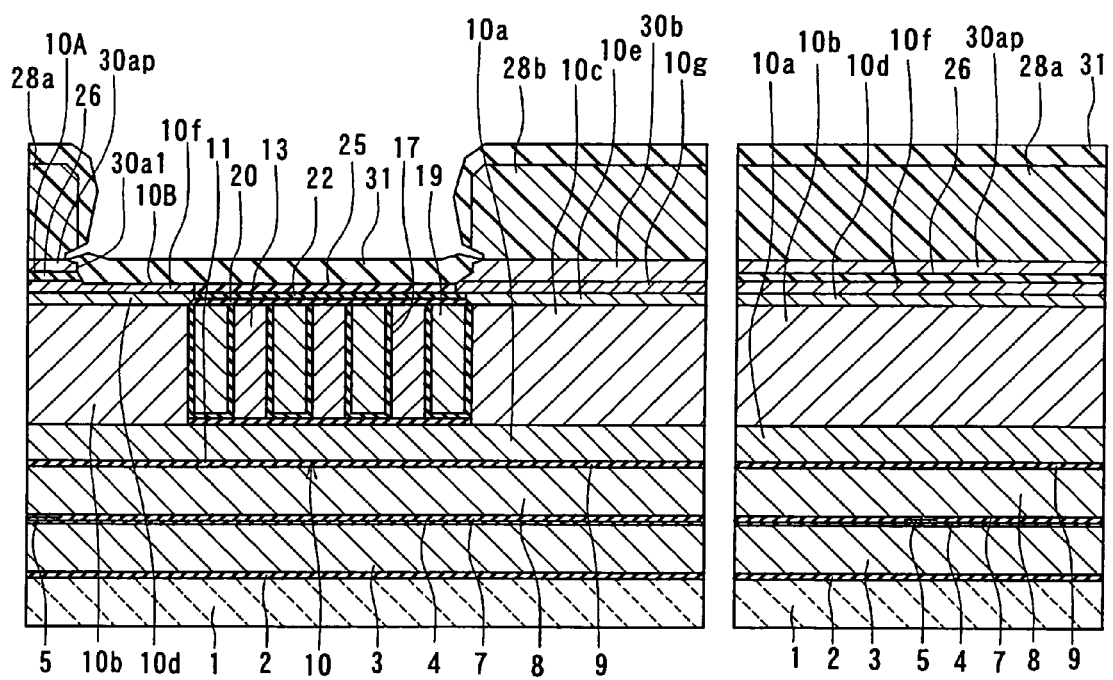
FIG. 10A and FIG. 10B are cross-sectional views for illustrating a step that follows FIG. 9A and FIG. 9B.

FIG. 10A and FIG. 10B illustrate the following step. In the step the magnetic layer 27 is selectively etched by ion beam etching, for example, through the use of the etching masks 28a and 28b. A magnetic layer 30ap and a coupling layer 30b are thereby made up of portions of the magnetic layer 27 remaining under the etching masks 28a and 28b after the etching.

The magnetic layer 30ap is disposed adjacent to the write gap layer 26. The magnetic layer 30ap is patterned later to be a throat height defining layer 30a. At this point the magnetic layer 30ap has a width greater than the write track width. The magnetic layer 30ap has an end portion 30a1 that defines the throat height. The coupling layer 30b is disposed on top of the coupling layer 10g. The above-mentioned etching may be performed such that the direction in which ion beams move forms an angle in a range of 0 to 20 degrees inclusive with respect to the direction orthogonal to the top surface of the first layer 10a. Next, to remove deposits on the sidewalls of the magnetic layer 27 after the etching, another etching is performed such that the direction in which ion beams move forms an angle in a range of 60 to 75 degrees inclusive with respect to the direction orthogonal to the top surface of the first layer 10a. By etching the magnetic layer 27 in such a manner, the end portion 30a1 for defining the throat height is formed to be nearly orthogonal to the top surface of the first layer 10a. The throat height is thereby defined with accuracy.

The magnetic layer 27 may be etched in the following manner. A mask is formed on the magnetic layer 27 by frame plating, for example. Next, the magnetic layer 27 is etched by reactive ion etching, for example, using the mask. A halogen gas such as $Cl_2$ or a mixture of $BCl_3$ and $Cl_2$ is utilized for the etching. The magnetic layer 27 is preferably etched at a temperature of 50° C. or higher so that the etching rate is increased. More preferably, the temperature falls within the range of 200 to 300° C. inclusive so that the etching is more successfully performed. It is preferred to use a gas containing a halogen gas and $O_2$ or $CO_2$ for etching the magnetic layer 27. The halogen gas may be a gas containing at least one of $Cl_2$ and $BCl_3$. Through the use of the mixture of $O_2$ and a halogen gas containing $Cl_2$, the profile of the magnetic layer 27 that has been etched is controlled with accuracy. If the mixture of $O_2$ and a halogen gas containing $Cl_2$ and $BCl_3$ is used, in particular, deposites of molecules of the halogen gas on the surface of the layered structure will be removed so that the surface of the layered structure is made very clean.

The rate of etching the magnetic layer 27 is higher if a gas containing $Cl_2$ and $CO_2$, a gas containing $Cl_2$, $BCl_3$ and $CO_2$, or a gas containing $BCl_3$, $Cl_2$, $O_2$ and $CO_2$ is used, compared to the case in which a gas that does not contain $CO_2$ is used. As a result, the etching selectivity of the magnetic layer 27 to the etching mask is increased by 30 to 50%.

After the magnetic layer 27 is etched, the write gap layer 26 is selectively etched and furthermore, the fourth layer 10f is selectively etched, each by ion beam etching, for example, using the etching masks 28a and 28b. The fourth layer 10f is etched to a depth somewhere in a middle of the thickness of the fourth layer 10f. The depth to which the fourth layer 10f is etched preferably falls within a range of 0.1 to 0.4 µm inclusive, and more preferably 0.1 to 0.3 µm inclusive.

Through the above-mentioned etching of the fourth layer 10f, a first surface 10A and a second surface 10B are formed on a surface of the bottom pole layer 10 facing toward the write gap layer 26. The first surface 10A includes an end located in the air bearing surface and the other end located opposite to the air bearing surface. The second surface 10B is disposed away from the air bearing surface. The first surface 10A is disposed adjacent to the write gap layer 26. There is a difference in level between the first surface 10A and the second surface 10B, so that the second surface 10B is located farther from the top pole layer 30 than the first surface 10A.

Next, a first nonmagnetic layer 31 made of a nonmagnetic material is formed by lift-off. That is, the nonmagnetic layer 31 having a thickness of 0.2 to 0.8 µm is formed to cover the entire top surface of the layered structure while the etching masks 28a and 28b are left unremoved. The nonmagnetic layer 31 is formed in a self-aligned manner such that the etched portions of the magnetic layer 27, the write gap layer 26 and the fourth layer 10f are filled with the nonmagnetic layer 31. The nonmagnetic layer 31 is preferably formed such that the top surface thereof is located in nearly the same level as the top surface of the magnetic layer 30ap. The nonmagnetic layer 31 may be made of an insulating material such as alumina.

Figures 11A, 11B:
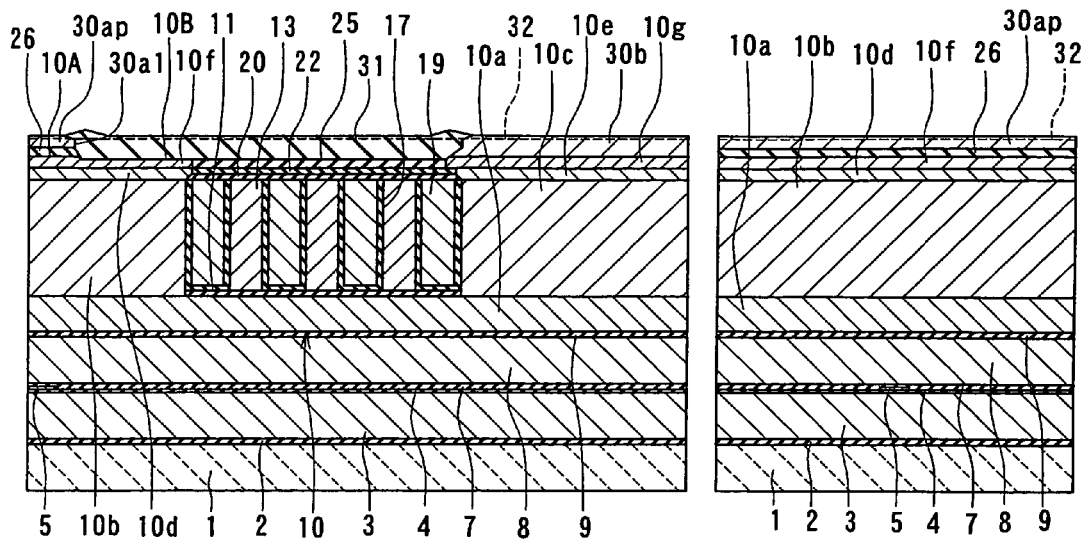
FIG. 11A and FIG. 11B are cross-sectional views for illustrating a step that follows FIG. 10A and FIG. 10B.

FIG. 11A and FIG. 11B illustrate the following step. In the step the etching masks 28a and 28b are lifted off, and the top surfaces of the magnetic layer 30ap, the coupling layer 30b and the nonmagnetic layer 31 are then polished and flattened by CMP, for example. In FIG. 11A and FIG. 11B numeral 32 indicates the level in which polishing is stopped. The depth to which the polishing is performed falls within a range of 10 to 50 nm inclusive, for example.

Figures 12A, 12B:
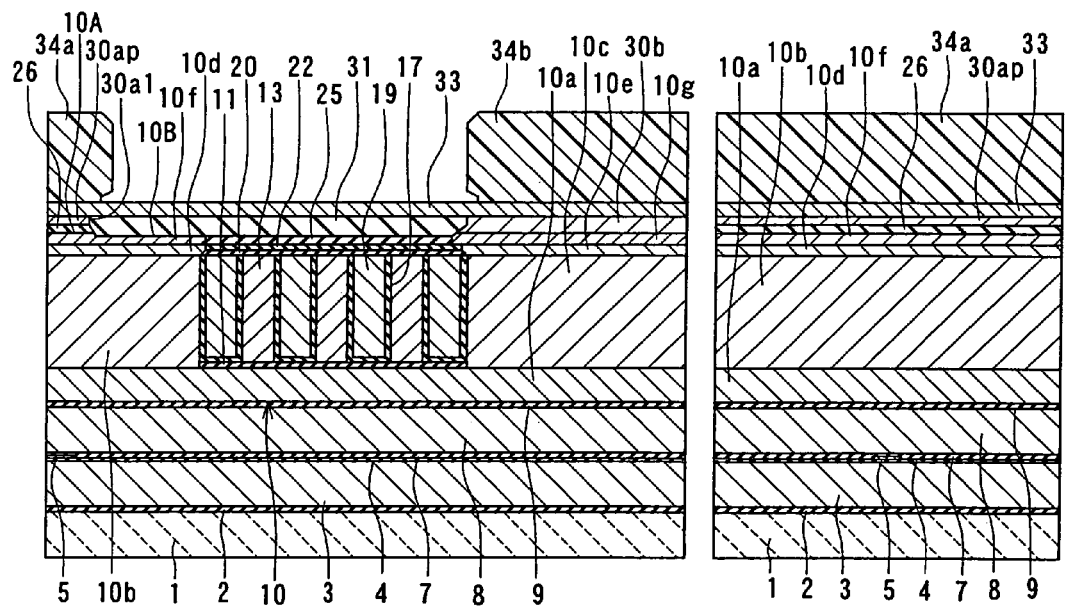
FIG. 12A and FIG. 12B are cross-sectional views for illustrating a step that follows FIG. 1A and FIG. 11B.

FIG. 12A and FIG. 12B illustrate the following step. In the step a second magnetic layer 33 made of a magnetic material and having a thickness of 0.1 to 0.3 µm is formed by sputtering, for example, to cover the entire top surface of the layered structure. The magnetic layer 33 is made of a high saturation flux density material such as CoFeN, FeAlN, FeN, FeCo or FeZrN. The magnetic layer 33 is preferably has a high saturation flux density. In the embodiment the magnetic layer 33 is made of CoFeN having a saturation flux density of 2.4 T, by way of example.

Next, etching masks 34a and 34b are formed on the magnetic layer 33. The etching mask 34a is a mask for forming an end portion of the magnetic layer 33 opposite to the air bearing surface. The mask 34a is disposed above the magnetic layer 30ap. The etching mask 34b is disposed above the coupling layer 30b. Each of the etching masks 34a and 34b has an undercut so that the bottom surface is smaller than the top surface in order to facilitate lift-off that will be performed later. Such etching masks 34a and 34b may be formed by patterning a resist layer made up of two stacked organic films, for example.

Figures 13A, 13B:
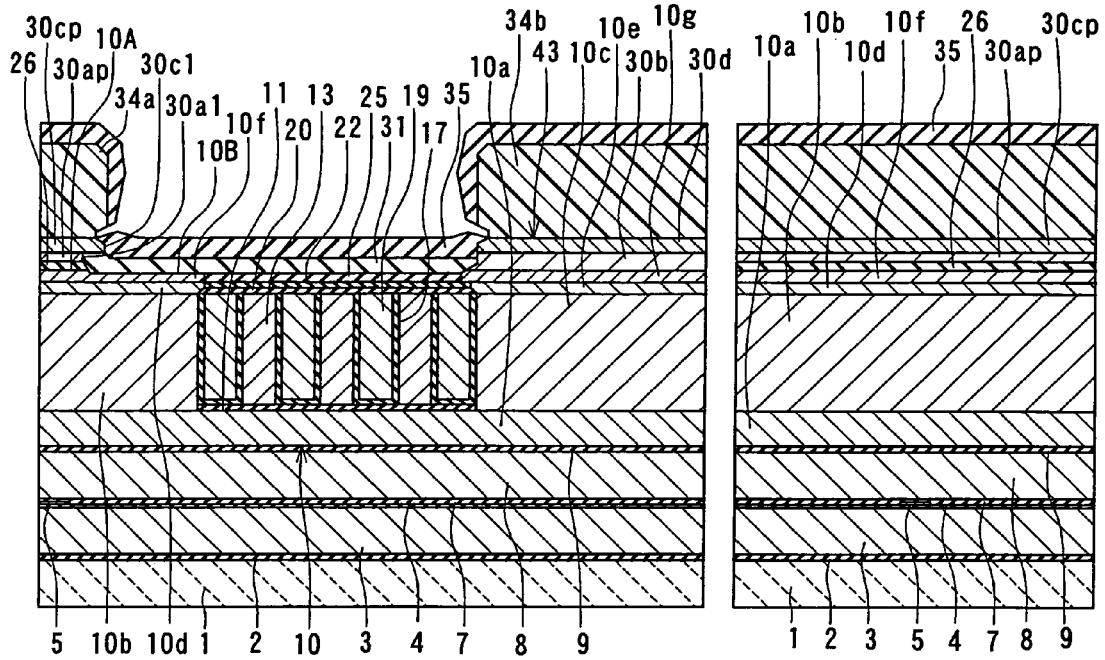
FIG. 13A and FIG. 13B are cross-sectional views for illustrating a step that follows FIG. 12A and FIG. 12B.

FIG. 13A and FIG. 13B illustrate the following step. In the step the magnetic layer 33 is selectively etched by ion beam etching, for example, through the use of the etching masks 34a and 34b. A magnetic layer 30cp and a coupling layer 30d are made up of portions of the magnetic layer 33 remaining under the etching masks 34a and 34b after the etching. The coupling layers 30b and 30d together with the coupling layers 10c, 10e and 10g make up the coupling section 43.

The magnetic layer 30cp is disposed on a side of the magnetic layer 30ap farther from the write gap layer 26. The magnetic layer 30cp will be patterned to be an intermediate layer 30c. At this time the magnetic layer 30cp has a width greater than the write track width. The magnetic layer 30cp has an end portion 30c1 located opposite to the air bearing surface. The coupling layer 30d is disposed on the coupling layer 30b. The magnetic layer 33 may be etched through a method similar to the method of etching the magnetic layer 27, for example.

Next, a second nonmagnetic layer 35 made of a nonmagnetic material is formed by lift-off. That is, the nonmagnetic layer 35 having a thickness of 0.2 to 0.4 µm is formed to cover the entire top surface of the layered structure while the etching masks 34a and 34b are left unremoved. The nonmagnetic layer 35 is formed in a self-aligned manner such that the etched portions of the magnetic layer 33 are filled with the nonmagnetic layer 35. The nonmagnetic layer 35 is preferably formed such that the top surface thereof is located in nearly the same level as the top surface of the magnetic layer 30cp. The nonmagnetic layer 35 may be made of an insulating material such as alumina.

Figures 14A, 14B:
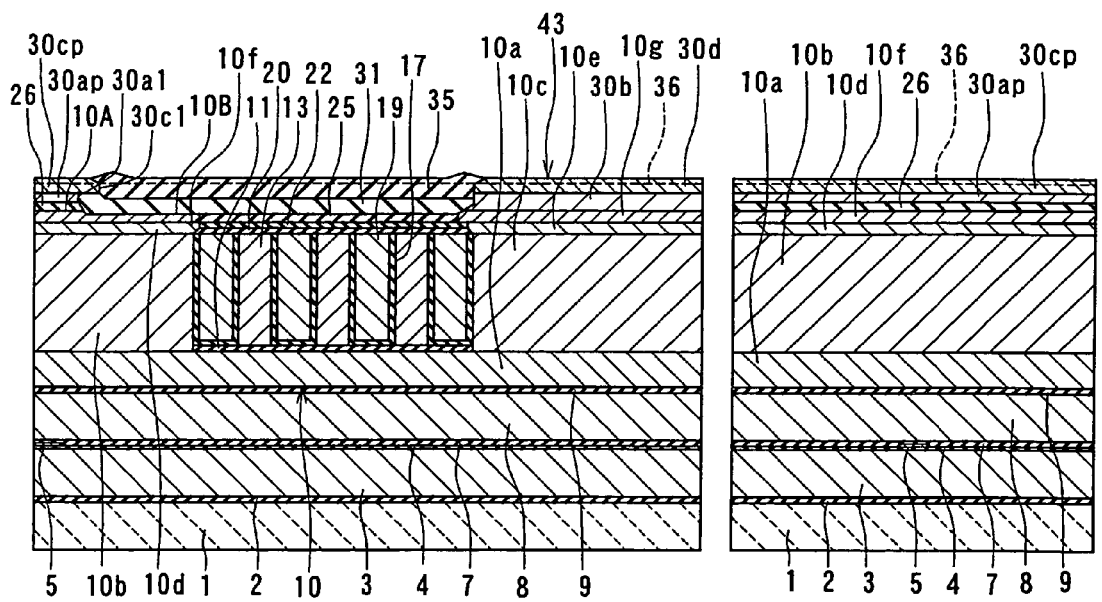
FIG. 14A and FIG. 14B are cross-sectional views for illustrating a step that follows FIG. 13A and FIG. 13B.

FIG. 14A and FIG. 14B illustrate the following step. In the step the etching masks 34a and 34b are lifted off, and the top surfaces of the magnetic layer 30cp, the coupling layer 30d and the nonmagnetic layer 35 are then polished and flattened by CMP, for example. In FIG. 14A and FIG. 14B numeral 36 indicates the level in which polishing is stopped. The depth to which the polishing is performed falls within a range of 10 to 50 nm inclusive, for example.

FIG. 15A and FIG. 15B illustrate the following step. In the step a magnetic layer 37 made of a magnetic material and having a thickness of 0.1 to 0.3 µm is formed by sputtering, for example, to cover the entire top surface of the layered structure. The magnetic layer 37 is made of a high saturation flux density material such as CoFeN, FeAlN, FeN, FeCo or FeZrN.

Next, a yoke portion layer 30f made of a magnetic material is formed by frame plating, for example, on the magnetic layer 37, wherein the magnetic layer 37 is used as an electrode and a seed layer. The yoke portion layer 30f has a thickness of 3 to 4 µm, for example. The yoke portion layer 30f may be made of CoNiFe or FeCo having a saturation flux density of 2.3 T, for example. The yoke portion layer 30f is disposed to extend from a region corresponding to the magnetic layer 30cp to a region corresponding to the coupling layer 30d.

FIG. 16A and FIG. 16B illustrate the following step. In the step the magnetic layers 37, 30cp and 30ap and the write gap layer 26 are selectively etched by ion beam etching, for example, using the yoke portion layer 30f as an etching mask. The magnetic layer 37 thus etched is a yoke portion layer 30e. The plane geometry of the yoke portion layer 30e is the same as that of the yoke portion layer 30f. The magnetic layer 30cp thus etched is the intermediate layer 30c. The magnetic layer 30ap thus etched is a throat height defining layer 30a. After the above-mentioned etching is performed, the yoke portion layer 30f has a thickness of 1 to 2 µm, for example. The top pole layer 30 is made up of the throat height defining layer 30a, the intermediate layer 30c, the coupling layers 30b and 30d, and the yoke portion layers 30e and 30f.

As shown in FIG. 19, the layered structure made up of the yoke portion layers 30e and 30f includes a second track width defining portion 30A and a yoke portion 30B. The second track width defining portion 30A has an end located in the air bearing surface 42 and the other end located away from the air bearing surface. The yoke portion 30B is coupled to the other end of the track width defining portion 30A. The track width defining portion 30A has a uniform width. The track width defining portion 30A initially has a width of about 0.15 to 0.2 µm, for example. The yoke portion 30B is equal in width to the track width defining portion 30A at the interface with the track width defining portion 30A. The yoke portion 30B gradually increases in width as the distance from the track width defining portion 30A increases, and then maintains a specific width to the end.

Next, although not shown, a photoresist mask having an opening around the track width defining portion 30A is formed. Using the photoresist mask and the track width defining portion 30A as masks, a portion of the fourth layer 10f is etched by ion beam etching, for example. This etching may be performed such that the direction in which ion beams move forms an angle in a range of 35 to 55 degrees inclusive, for example, with respect to the direction orthogonal to the top surface of the first layer 10a. The depth to which the fourth layer 10f is etched is preferably 0.1 to 0.4 µm, and more preferably 0.1 to 0.3 µm. If the depth to which the etching is performed is 0.5 µm or greater, the occurrences of side write or side erase increase.

A trim structure is thereby formed, wherein a portion of the fourth layer 10f, the write gap layer 26, the throat height defining layer 30a, the intermediate layer 30c, and the track width defining portion 30A have the same widths in the air bearing surface. The trim structure suppresses an increase in the effective recording track width due to expansion of a magnetic flux generated during writing in a narrow track.

Next, sidewalls of the portion of the fourth layer 10f, the write gap layer 26, the throat height defining layer 30a, the intermediate layer 30c and the track width defining portion 30A are etched by ion beam etching, for example, to reduce the widths of these layers in the air bearing surface down to 0.1 µm, for example. This etching may be performed such that the direction in which ion beams move forms an angle in a range of 40 to 75 degrees inclusive, for example, with respect to the direction orthogonal to the top surface of the first layer 10a.

Figures 17A, 17B:
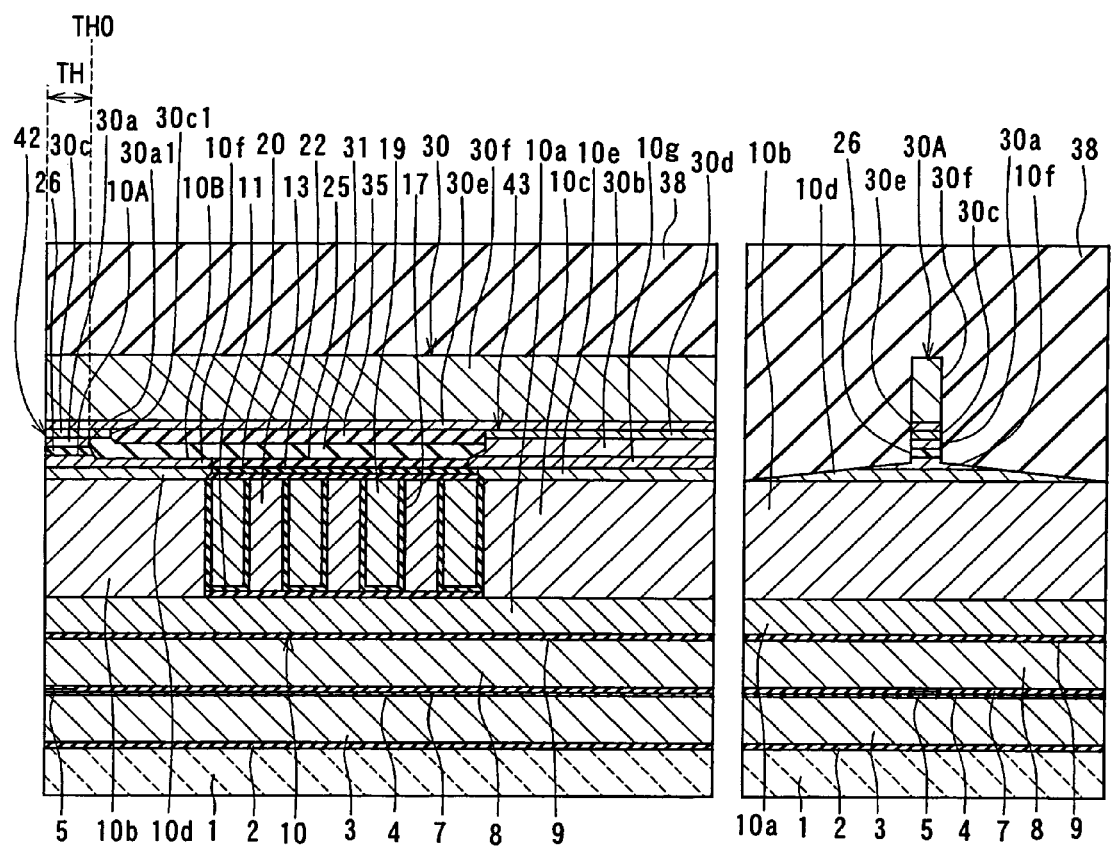
FIG. 17A and FIG. 17B are cross-sectional views for illustrating a step that follows FIG. 16A and FIG. 16B.

FIG. 17A and FIG. 17B illustrate the following step. In the step the overcoat layer 38 made of alumina, for example, and having a thickness of 20 to 30 μm is formed so as to cover the entire top surface of the layered structure. The surface of the overcoat layer 38 is flattened, and electrode pads (not shown) are formed thereon. Finally, the slider including the foregoing layers is lapped to form the air bearing surface 42. The thin-film magnetic head including the read and write heads is thus completed.

According to the embodiment, the following method may be employed to form the yoke portion layers as shown in FIG. 20A and FIG. 20B, instead of forming the yoke portion layers 30e and 30f by frame plating as described with reference to FIG. 15A and FIG. 15B. FIG. 20A is a cross section orthogonal to the air bearing surface and the top surface of the substrate. FIG. 20B is a cross section of the pole portions parallel to the air bearing surface. In this method a magnetic layer made of a magnetic material and having a thickness of 1.0 to 1.5 μm is formed by sputtering on the entire top surface of the layered structure including the flattened top surfaces of the magnetic layer 30cp, the coupling layer 30d and the nonmagnetic layer 35. The magnetic layer may be made of CoFeN or FeCo having a saturation flux density of 2.4 T. Next, an insulating layer made of alumina, for example, and having a thickness of 0.3 to 2.0 μm is formed on the magnetic layer. Next, an etching mask having a thickness of 0.5 to 1.0 μm, for example, is formed by frame plating, for example, on the insulating layer. The etching mask may be made of NiFe (45 weight % Ni and 55 weight % Fe), CoNiFe (67 weight % Co, 15 weight % Ni and 18 weight % Fe) having a saturation flux density of 1.9 to 2.1 T, or FeCo (60 weight % Fe and 40 weight % Co) having a saturation flux density of 2.3 T. The plane geometry of the etching mask is the same as that of the yoke portion layer 30f. The etching mask has a portion for defining the track width. This portion has a width of 0.1 to 0.2 μm, for example.

Next, the insulating layer is selectively etched by reactive ion etching, for example, using the etching mask. A halogen gas such as $Cl_2$ or a mixture of $BCl_3$ and $Cl_2$ is utilized for this etching. The etching mask may be either removed or left unremoved through the etching. If the etching mask is removed, it is possible to perform etching of the magnetic layer later with more accuracy. Next, the magnetic layer is selectively etched by reactive ion etching, for example, using the insulating layer as another etching mask 39. The magnetic layer is preferably etched at a temperature of 50° C. or higher so that the etching rate is increased. More preferably, the temperature falls within the range of 200 to 300° C. inclusive so that the etching is more successfully performed. The magnetic layer that has been etched serves as a yoke portion layer 30g. In this example the top pole layer 30 is made up of the throat height defining layer 30a, the intermediate layer 30c, the coupling layers 30b and 30d, and the yoke portion layer 30g.

Alternatively, as shown in FIG. 20A and FIG. 20B, it is possible that the etching mask 39 is formed on the magnetic layer to be the yoke portion layer 30g as described above, and the magnetic layer 30ap (See FIG. 15A and FIG. 15B.), the magnetic layer 30cp, and the magnetic layer to be the yoke portion layer 30g are selectively etched by reactive ion etching, using the etching mask 39 to form the yoke portion layer 30g, the intermediate layer 30c, and the throat height defining layer 30a. In this case, the write gap layer 26 is preferably made of a nonmagnetic inorganic material such as alumina, silicon carbide (SiC), or aluminum nitride (AlN). It is thereby possible that the etching rate of the write gap layer 26 is lower than that of the magnetic layer when the magnetic layer made of a magnetic material including at least iron that is one of the group consisting of iron and cobalt, such as CoFeN or FeCo, is etched by reactive ion etching. As a result, the sidewalls of the magnetic layer that has been etched form an angle of nearly 90 degrees with respect to the top surface of the write gap layer 26. It is thereby possible to define the track width with accuracy.

This feature will now be described in detail. For example, a case is considered wherein the magnetic layer including at least iron that is one of the group consisting of iron and cobalt is etched by reactive ion etching, using the etching mask 39 made of alumina. In this case, a product formed through a plasma reaction between $Cl_2$ of the etching gas and iron or iron and cobalt of the magnetic layer deposits on the sidewalls of the magnetic layer that has been etched. As a result, during the etching, until the bottom portion formed through the etching reaches the neighborhood of the write gap layer 26, the magnetic layer etched is likely to have the shape in which the width thereof increases as the distance to the lower portion of the magnetic layer decreases. However, the amount of the above-mentioned product formed through the plasma reaction extremely decreases when the bottom portion formed through the etching reaches the neighborhood of the write gap layer 26. If the etching is further continued after the bottom portion reaches the write gap layer 26, portions of the sidewalls of the magnetic layer etched, the portions being near the bottom portion, are then etched, and the magnetic layer etched finally has a shape in which the sidewalls of the magnetic layer etched form an angle of nearly 90 degrees with respect to the top surface of the write gap layer 26. To form the magnetic layer having such a shape, it is required that the other magnetic layer below the write gap layer 26 would not be exposed during the etching until the magnetic layer etched has the above-mentioned shape. This is because, if the other magnetic layer below the write gap layer 26 is exposed during the etching, a product of a plasma reaction formed through the etching of the magnetic layer exposed deposits on the sidewalls of the magnetic layer etched.

Here, if the write gap layer 26 is made of a nonmagnetic inorganic material such as alumina, silicon carbide (SiC), or aluminum nitride (AlN), the etching rate of the write gap layer 26 is lower than that of the magnetic layer. It is thereby possible to prevent the other magnetic layer below the write gap layer 26 from being exposed during the etching until the magnetic layer etched has the above-mentioned shape. As a result, the sidewalls of the magnetic layer that has been etched form an angle of nearly 90 degrees with respect to the top surface of the write gap layer 26.

The following are preferred conditions for etching the magnetic layer by reactive ion etching as described above. The pressure in the chamber (the degree of vacuum) is preferably 0.1 to 1.0 Pa. The temperature at which the etching is performed is preferably 200 to 300° C. The etching gas preferably includes $Cl_2$, and more preferably includes $BCl_3$ and $CO_2$, in addition to $Cl_2$. The flow rate of $Cl_2$ of the etching gas is preferably 100 to 300 ccm. The flow rate of $BCl_3$ of the etching gas is preferably 50% of the flow rate of $Cl_2$ or lower. If the flow rate of $BCl_3$ is higher than 50% of the flow rate of $Cl_2$, alumina is likely to be etched. The flow rate of $CO_2$ of the etching gas is preferably 10% of the flow rate of $Cl_2$ or lower. If the flow rate of $CO_2$ is higher than 10% of the flow rate of $Cl_2$, the sidewalls of the magnetic layer form a greater angle with respect to the direction orthogonal to the top surface of the write gap layer 26. The substrate bias for the etching is preferably 150 to 500 W.

For etching the magnetic layer by reactive ion etching as described above, the etching mask 39 is preferably made of a nonmagnetic inorganic material such as alumina, silicon carbide (SiC), or aluminum nitride (AlN), which is similar to the write gap layer 26. This is because, as in the case of the write gap layer 26, the etching rate of the etching mask 39 is lower than that of the magnetic layer when the magnetic layer made of a magnetic material including at least iron that is one of the group consisting of iron and cobalt, such as CoFeN or FeCo, is etched by reactive ion etching.

If the magnetic layer is etched by reactive ion etching and the yoke portion layer 30g, the intermediate layer 30c and the throat height defining layer 30a are thereby formed as described above, the write gap layer 26 is then etched by ion beam etching, for example, using the throat height defining layer 30a as a mask. Next, a photoresist mask (not shown) having an opening around the track width defining portion 30A is formed. A portion of the fourth layer 10f is etched by ion beam etching, for example, using the photoresist mask and the track width defining portion 30A as masks. A trim structure is thereby formed.

According to the embodiment, the second coil 19 may be made by the following method, instead of the method described with reference to FIG. 3A to FIG. 6A, and FIG. 3B to FIG. 6B. In this method the insulating film 17 is formed in addition to the state shown in FIG. 2A and FIG. 2B to cover the entire top surface of the layered structure. Next, an electrode film is formed to cover the entire top surface of the layered structure. On the electrode film the conductive layer 19p made of a metal such as Cu and having a thickness of 3 to 4 µm, for example, is formed by frame plating, for example. Next, portions of the electrode film except the portion below the conductive layer 19p are removed by ion beam etching, for example. Next, an insulating layer made of alumina, for example, and having a thickness of 3 to 5 µm is formed to cover the entire top surface of the layered structure. The insulating layer is then polished by CMP, for example, so that the second layer 10b, the coupling layer 10c and the first coil 13 are exposed. The second coil 19 is thereby made up of the conductive layer 19p and the electrode film remaining in the space between the second layer 10b and the first coil 13, the space between the turns of the first coil 13, and the space between the coupling layer 10c and the first coil 13.

The thin-film magnetic head according to the present embodiment comprises the air bearing surface 42 serving as a medium facing surface that faces toward a recording medium. The magnetic head further comprises the read head and the write head (the induction-type electromagnetic transducer).

49 The read head includes: the MR element 5 located near the air bearing surface 42; the bottom shield layer 3 and the top shield layer 8 for shielding the MR element 5; the bottom shield gap film 4 located between the MR element 5 and the bottom shield layer 3; and the top shield gap film 7 located between the MR element 5 and the top shield layer 8. The portions of the bottom shield layer 3 and the top shield layer 8 located on a side of the air bearing surface 42 are opposed to each other with the MR element 5 in between.

The write head comprises the bottom pole layer 10 and the top pole layer 30 that are magnetically coupled to each other and include the pole portions opposed to each other and located in the regions of the pole layers on the side of the air bearing surface 42. The write head further comprises: the write gap layer 26 disposed between the pole portion of the bottom pole layer 10 and the pole portion of the top pole layer 30; and the coils 13 and 19. The coils 13 and 19 are provided such that at least part thereof is disposed between the bottom pole layer 10 and the top pole layer 30 and insulated from the bottom pole layer 10 and the top pole layer 30. The bottom pole layer 10 and the top pole layer 30 of the present embodiment correspond to the first pole layer and the second pole layer of the invention, respectively. 50 The bottom pole layer 10 includes the first layer 10a, the second layer 10b, the third layer 10d, the fourth layer 10f, and the coupling layers 10c, 10e and 10g. The first layer 10a is disposed to be opposed to the coils 13 and 19. The second layer 10b is disposed near the air bearing surface 42 and connected to the first layer 10a in such a manner that the second layer 10b protrudes closer toward the top pole layer 30 than the first layer 10a. The third layer 10d is disposed near the air bearing surface 42 and connected to the second layer 10b in such a manner that the third layer 10d protrudes closer toward the top pole layer 30 than the second layer 10b. The fourth layer 10f is disposed near the air bearing surface 42 and connected to the third layer 10d in such a manner that the fourth layer 10f protrudes closer toward the top pole layer 30 than the third layer 10d.

The surface of the bottom pole layer 10 closer to the write gap layer 26 incorporates the first surface 10A and the second surface 10B. The first surface 10A includes the end located in the air bearing surface 42 and the other end located farther from the air bearing surface 42. The second surface 10B is disposed away from the air bearing surface 42. The first surface 10A is disposed adjacent to the write gap layer 26. There is a difference in level between the first surface 10A and the second surface 10B, so that the second surface 10B is located farther from the top pole layer 30 than the first surface 10A.

The top pole layer 30 incorporates the throat height defining layer 30a that is disposed adjacent to the write gap layer 26 and includes the end portion 30a1 for defining the throat height. The top pole layer 30 further incorporates: the intermediate layer 30c disposed on a side of the throat height defining layer 30a farther from the write gap layer 26; the yoke portion layers 30e and 30f disposed on a side of the intermediate layer 30c farther from the throat height defining layer 30a; and the coupling layers 30b and 30d. The yoke portion layers 30e and 30f include the track width defining portion 30A for defining the track width.

The width of each of the throat height defining layer 30a, the intermediate layer 30c, and the track width defining portion 30A taken in the air bearing surface 42 is equal to the track width. The length of the intermediate layer 30c is greater than the length of the throat height defining layer 30a, and the length of the yoke portion layers 30e and 30f is greater than the length of the intermediate layer 30c, each of the lengths being taken in the direction orthogonal to the air bearing surface 42. The intermediate layer 30c and the yoke portion layers 30e and 30f are flat layers.

The throat height defining layer 30a includes an end portion located in the air bearing surface 42 and the other end portion 30a1 located farther from the air bearing surface 42. The throat height defining layer 30a corresponds to the first layer of the second pole layer of the invention. Each of the yoke portion layers 30e and 30f corresponds to the second layer of the second pole layer of the invention. The coupling layers 10c, 10e, 10g, 30b and 30d make up the coupling section 43 for magnetically coupling the bottom pole layer 10 to the top pole layer 30.

The fourth layer 10f of the bottom pole layer 10 has a portion that faces toward the throat height defining layer 30a of the top pole layer 30, the write gap layer 26 being disposed in between. This portion is the pole portion of the bottom pole layer 10. The throat height defining layer 30a is the pole portion of the top pole layer 30. As shown in FIG. 17A, throat height TH is the distance between the air bearing surface 42 and the end portion 30a1 of the throat height defining layer 30a. Zero throat height level TH0 is the level of the end portion 30a1 of the throat height defining layer 30a. Each of the fourth layer 10f and the throat height defining layer 30a preferably has a saturation flux density of 2.4 T or greater.

As shown in FIG. 18, the thin-film coil of the embodiment includes the first coil 13, the second coil 19 and the connecting layer 21. The first coil 13 has turns part of which is disposed between the second layer 10b and the coupling layer 10c. The second coil 19 has turns at least part of which is disposed between turns of the first coil 13. The connecting layer 21 is disposed on a side of the third layer 10d and connects the coil 13 to the coil 19 in series. Part of the turns of the second coil 19 is disposed between the second layer 10b and the coupling layer 10c, too. The coils 13 and 19 are both flat whorl-shaped and disposed around the coupling portion 43. The coils 13 and 19 are both wound clockwise from the outer end to the inner end. The connecting layer 21 connects the connecting portion 13a of the coil 13 to the connecting portion 19b of the coil 19 at the minimum distance. The connecting layer 21 has a thickness smaller than the thickness of each of the coils 13 and 19. The coils 13 and 19 and the connecting layer 21 are all made of a metal, such as Cu. The thin-film coil of the embodiment has seven turns although the invention is not limited to the seven-turn coil.

The method of manufacturing the thin-film magnetic head of the embodiment comprises the steps of: forming the bottom pole layer 10; forming the thin-film coil (made up of the coils 13 and 19 and the connecting layer 21) on the bottom pole layer 10; and forming the write gap layer 26 on the pole portion of the bottom pole layer 10.

The method further comprises the steps of: forming the magnetic layer 27 on the write gap layer 26 for forming the throat height defining layer 30a; forming the etching mask 28a on the magnetic layer 27 for forming the end portion 30a1 for defining the throat height in the magnetic layer 27; and forming the end portion 30a1 for defining the throat height in the magnetic layer 30ap, the magnetic layer 30ap being made up of the magnetic layer 27 etched, and forming the first surface 10A and the second surface 10B of the surface of the bottom pole layer 10 closer to the write gap layer 26, by selectively etching the magnetic layer 27, the write gap layer 26 and the fourth layer 10f through the use of the etching mask 28a.

The method of the embodiment further comprises the steps of: forming the nonmagnetic layer 31 so as to fill the etched portions of the magnetic layer 27, the gap layer 26 and the fourth layer 10f while the mask 28a is left unremoved; removing the mask 28a after the nonmagnetic layer 31 is formed; and flattening the top surfaces of the magnetic layer 30ap and the nonmagnetic layer 31, the magnetic layer 30ap being made up of the magnetic layer 27 etched, by polishing such as CMP, after the mask 28a is removed.

The method of the embodiment further comprises the steps of: forming the magnetic layer 33 on the flattened top surfaces of the magnetic layer 30ap and the nonmagnetic layer 31 for forming the intermediate layer 30c; forming the etching mask 34a on the magnetic layer 33 for making the end portion 30c1 of the magnetic layer 33 located opposite to the air bearing surface 42; and forming the end portion 30c1 of the magnetic layer 30cp by selectively etching the magnetic layer 33 through the use of the etching mask 34a, the magnetic layer 30cp being made up of the magnetic layer 33 that has been etched.

The method further comprises the steps of: forming the nonmagnetic layer 35 so as to fill the etched portion of the magnetic layer 33 while the mask 34a is left unremoved; removing the mask 34a after the nonmagnetic layer 35 is formed; and flattening the top surfaces of the magnetic layer 30cp and the nonmagnetic layer 35, the magnetic layer 30cp being made up of the magnetic layer 33 etched, by polishing such as CMP, after the mask 34a is removed.

The method further comprises the steps of: forming the yoke portion layers 30e and 30f on the flattened top surfaces of the magnetic layer 30cp and the nonmagnetic layer 35; and etching the magnetic layers 30cp and 30ap, the write gap layer 26 and a portion of the fourth layer 10f of the bottom pole layer 10 to align with the width of the track width defining portion 30A through the use of the track width defining portion 30A of the yoke portion layers 30e and 30f as a mask. Through this step the magnetic layer 30cp is patterned to form the intermediate layer 30c, and the magnetic layer 30ap is patterned to form the throat height defining layer 30a. In addition, each of the portion of the fourth layer 10f, the write gap layer 26, the throat height defining layer 30a, the intermediate layer 30c, and the track width defining portion 30A is made to have a width taken in the air bearing surface 42 that is equal to the track width.

According to the embodiment, in the step of forming the end portion 30a1 for defining the throat height in the magnetic layer 30ap by selectively etching the magnetic layer 27, the magnetic layer 30ap being made up of the magnetic layer 27 etched, the write gap layer 26 and the fourth layer 10f of the bottom pole layer 10 are selectively etched to the depth somewhere in the middle of the thickness of the fourth layer 10f.

According to the embodiment, each of the bottom pole layer 10 and the top pole layer 30 has the stepped portion for increasing the distance between the two pole layers 10 and 30 in a region farther from the air bearing surface 42 than the zero throat height level TH0. Therefore, according to the embodiment, the distance between the two pole layers 10 and 30 in the region farther from the air bearing surface 42 than the zero throat height level TH0 is increased without making a very great difference in level between the first surface 10A and the second surface 10B of the bottom pole layer 10. As a result, according to the embodiment, it is possible to prevent an extreme reduction in the volume of the portion of the bottom pole layer 10 sandwiched between the side portions forming the trim structure, and to prevent a sudden decrease in the cross-sectional area of the magnetic path near the interface between the above-mentioned portion of the bottom pole layer 10 and the other portion.

According to the embodiment, the throat height defining layer 30a, the intermediate layer 30c and the yoke portion layers 30e and 30f are stacked one by one on the write gap layer 26. Each of the throat height defining layer 30a, the intermediate layer 30c and the track width defining portion 30A has a width taken in the air bearing surface 42 that is equal to the track width. In addition, the length of the intermediate layer 30c taken in the direction orthogonal to the air bearing surface 42 is greater than the length of the throat height defining layer 30a. The length of the yoke portion layers 30e and 30f taken in the direction orthogonal to the air bearing surface 42 is greater than the length of the intermediate layer 30c.

According to the embodiment, these features achieve an increase in the distance between the top pole layer 30 and the bottom pole layer 10 in the region farther from the air bearing surface 42 than the zero throat height level TH0. In addition, the cross-sectional area of the magnetic path of the top pole layer 30 near the air bearing surface 42 is made to gradually change.

According to the embodiment, these features prevent saturation and leakage of flux halfway through the magnetic path. The overwrite property is thereby improved.

According to the embodiment, it is possible to prevent an extreme reduction in the volume of the portion of the bottom pole layer 10 sandwiched between the side portions forming the trim structure. As a result, it is possible to prevent leakage of magnetic flux from the neighborhood of the bottom of the stepped portion of the trim structure that belongs to the end face of the bottom pole layer 10 exposed from the air bearing surface 42 toward the recording medium, in particular. It is thereby possible to prevent side write and side erase.

In the air bearing surface 42 the throat height defining layer 30a, the intermediate layer 30c and the yoke portion layers 30e and 30f have equal widths. Therefore, there is no sudden variation in width in the end face of the top pole layer 30 exposed from the air bearing surface 42. As a result, an amount of flux leakage from the end face of the top pole layer 30 exposed from the air bearing surface 42 is small, and it is possible to prevent a reduction in overwrite property and to prevent the occurrences of side write and side erase.

According to the embodiment, the nonmagnetic layer 31 is formed by lift-off so as to fill the etched portions of the magnetic layer 27, the write gap layer 26 and the fourth layer 10f. It is therefore possible to flatten the top surfaces of the throat height defining layer 30a and the nonmagnetic layer 31 by a small amount of polishing. It is thereby possible to determine the thickness of the pole portion of the top pole layer 30 with accuracy. Similarly, according to the embodiment, the nonmagnetic layer 35 is formed by lift-off so as to fill the etched portion of the magnetic layer 33. It is therefore possible to flatten the top surfaces of the intermediate layer 30c and the nonmagnetic layer 35 by a small amount of polishing. It is thereby possible to determine the thickness of the intermediate layer 30c with accuracy. Owing to these features, according to the embodiment, the thickness of the top pole layer 30 exposed from the air bearing surface 42 is controlled with accuracy. As a result, the writing characteristics of the thin-film magnetic head are easily controlled with accuracy. The nonmagnetic layer 31 may be formed such that the top surface thereof is disposed in the level almost the same as the level of the top surface of the throat height defining layer 30a. It is thereby possible to omit the step of flattening the top surfaces of the magnetic layer 30ap and the nonmagnetic layer 31 by polishing. Similarly, the nonmagnetic layer 35 may be formed such that the top surface thereof is disposed in the level almost the same as the level of the top surface of the intermediate layer 30c. It is thereby possible to omit the step of flattening the top surfaces of the magnetic layer 30cp and the nonmagnetic layer 35 by polishing.

According to the embodiment, the yoke portion layers 30e and 30f of the top pole layer 30 are flat layers formed on the nearly flat base layer. As a result, according to the embodiment, it is possible to form the track width defining portion 30A that is small in size with accuracy. It is thereby possible to reduce the track width and improve the writing density.

According to the embodiment, the second layer 10b, the third layer 10d, the fourth layer 10f and the top pole layer 30 may be made of a high saturation flux density material. It is thereby possible to prevent a saturation of flux halfway through the magnetic path. To achieve this, it is particularly effective that the fourth layer 10f and the throat height defining layer 30a are made of a high saturation flux density material having a saturation flux density of 2.4 T or greater. It is thereby possible to use the magnetomotive force generated by the thin-film coil for writing with efficiency. It is thus possible to achieve the write head having an excellent overwrite property.

According to the embodiment, the first coil 13 is formed on the first layer 10a having an entirely flat top surface. It is thus possible to form the first coil 13 that is thick but small in size with accuracy. According to the embodiment, the second coil 19 is formed such that at least part of the turns of the second coil 19 is disposed between the turns of the first coil 13. It is thereby possible to form the second coil 19 that is thick but small in size with accuracy, too. According to the embodiment, it is the thin insulating film 17 that separates the second layer 10b from the second coil 19, the turns of the first coil 13 from the turns of the second coil 19, and the coupling layer 10c from the second coil 19. It is thereby possible that the space between the second layer 10b and the second coil 19, the space between the turns of the first coil 13 and the turns of the second coil 19, and the space between the coupling layer 10c and the second coil 19 are made very small.

The foregoing features of the embodiment allow the coils 13 and 19 to be thick and the yoke length to be short. It is thereby possible to reduce the resistance of the thin-film coil while the yoke length is reduced, that is, the magnetic path length is reduced. As a result, according to the embodiment of the invention, it is possible to achieve the thin-film magnetic head having a reduced magnetic path length and thus having excellent writing characteristics in a high frequency band, and having the thin-film coil with a low resistance.

According to the embodiment, an outer portion of the thin-film coil is disposed adjacent to the second layer 10b, the thin insulating film 17 being located in between. That is, the thin-film coil is disposed near the air bearing surface 42. As a result, according to the embodiment, it is possible to utilize the magnetomotive force generated by the thin-film coil for writing with efficiency. It is thereby possible to achieve the write head having an excellent overwrite property.

According to the embodiment, a coil for connecting the coil 13 to the coil 19 in series may be provided in place of the connecting layer 21. It is thereby possible to increase the number of turns of the thin-film coil without increasing the yoke length while an increase in resistance of the thin-film coil is prevented.

(Second Embodiment)

Reference is now made to FIG. 21A to FIG. 27A and FIG. 21B to FIG. 27B to describe a method of manufacturing a thin-film magnetic head of a second embodiment of the invention. FIG. 21A to FIG. 27A are cross sections orthogonal to the air bearing surface and the top surface of the substrate. FIG. 21B to FIG. 27B are cross sections of the pole portions parallel to the air bearing surface.

The method of manufacturing the thin-film magnetic head of the second embodiment includes the steps up to the step of forming the insulating layer 25 as shown in FIG. 8A and FIG. 8B that are the same as those of the first embodiment.

FIG. 21A and FIG. 21B illustrate the following step. In the step the write gap layer 26 having a thickness of 0.07 to 0.1 μm is formed to cover the entire top surface of the layered structure. The write gap layer 26 may be made of an insulating material such as alumina or a nonmagnetic metal such as Ru, NiCu, Ta, W or NiB. Next, a portion of the write gap layer 26 corresponding to the coupling layer 10g is selectively etched.

Next, the etching mask 28a is formed on the write gap layer 26 and the etching mask 28b is formed on the coupling layer 10g. The etching mask 28a is provided for forming an end portion for defining the throat height in the write gap layer 26, and is disposed above the fourth layer 10f. Each of the etching masks 28a and 28b has an undercut so that the bottom surface is smaller than the top surface in order to facilitate lift-off that will be performed later. Such etching masks 28a and 28b may be formed by patterning a resist layer made up of two stacked organic films, for example.

Figures 22A, 22B:
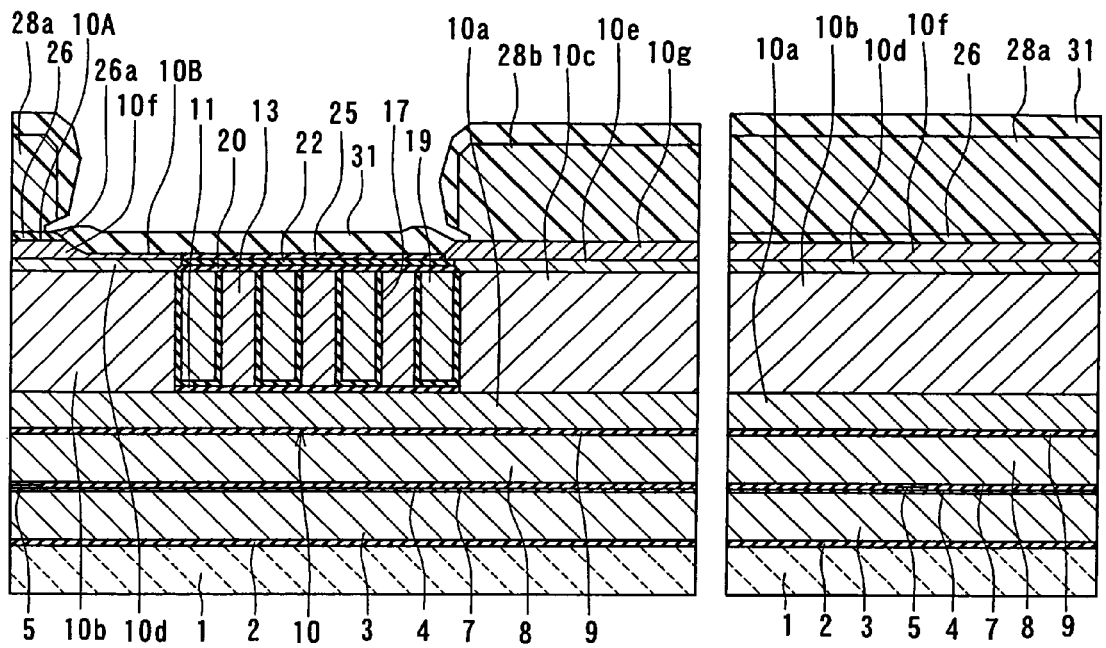
FIG. 22A and FIG. 22B are cross-sectional views for illustrating a step that follows FIG. 21A and FIG. 21B.

FIG. 22A and FIG. 22B illustrate the following step. In the step the write gap layer 26 is selectively etched and furthermore, the fourth layer 10f is selectively etched, each by ion beam etching, for example, using the etching masks 28a and 28b. The fourth layer 10f is etched to a depth somewhere in a middle of the thickness of the fourth layer 10f. The depth to which the fourth layer 10f is etched preferably falls within a range of 0.1 to 0.4 μm inclusive, and more preferably 0.1 to 0.3 μm inclusive. Through this etching, the end portion 26a for defining the throat height is formed in the write gap layer 26. Through the etching of the fourth layer 10f, the first surface 10A and the second surface 10B having a difference in level are formed on a surface of the bottom pole layer 10 closer to the write gap layer 26.

Next, the nonmagnetic layer 31 made of a nonmagnetic material is formed by lift-off. That is, the nonmagnetic layer 31 having a thickness of 0.2 to 0.8 μm is formed to cover the entire top surface of the layered structure while the etching masks 28a and 28b are left unremoved. The nonmagnetic layer 31 is formed in a self-aligned manner such that the etched portions of the write gap layer 26 and the fourth layer 10f are filled with the nonmagnetic layer 31. The nonmagnetic layer 31 is preferably formed such that the top surface thereof is located in nearly the same level as the top surface of the write gap layer 26. The nonmagnetic layer 31 may be made of an insulating material such as alumina.

Figures 23A, 23B:
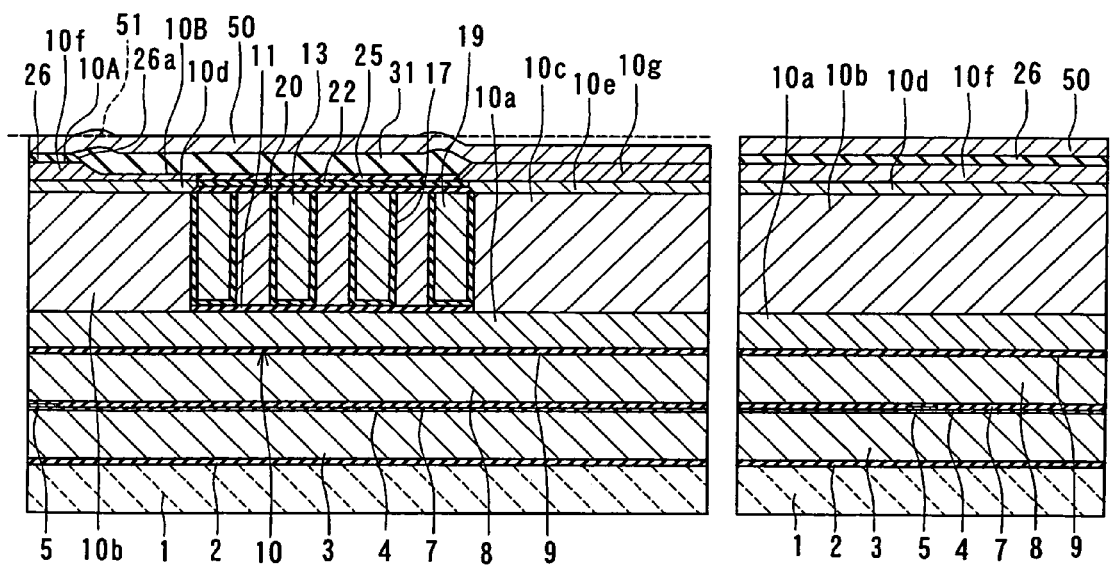
FIG. 23A and FIG. 23B are cross-sectional views for illustrating a step that follows FIG. 22A and FIG. 22B.

FIG. 23A and FIG. 23B illustrate the following step. In the step the etching masks 28a and 28b are lifted off, and a magnetic layer 50 made of a magnetic material and having a thickness of 0.1 to 0.2 μm is formed by sputtering, for example, on the entire top surface of the layered structure. According to the embodiment, the base layer of the magnetic layer 50 has projections and depressions so that the magnetic layer 50 is made to have an uneven top surface, too. The magnetic layer 50 is made of a high saturation flux density material such as CoFeN, FeAlN, FeN, FeCo or FeZrN. The magnetic layer 50 preferably has a saturation flux density of 2.4 T or greater. In the embodiment the magnetic layer 50 is made of CoFeN having a saturation flux density of 2.4 T by way of example. The magnetic layer 50 is connected to the coupling layer 10g.

Next, the top surface of the magnetic layer 50 is polished by CMP, for example, and flattened. In FIG. 23A and FIG. 23B numeral 51 indicates the level in which the polishing is stopped. The polishing is performed to such an extent that the projections and depressions of the top surface of the magnetic layer 50 are removed. The depth to which the polishing is performed falls within a range of 10 to 50 nm inclusive, for example. This step of flattening may be omitted.

Figures 24A, 24B:
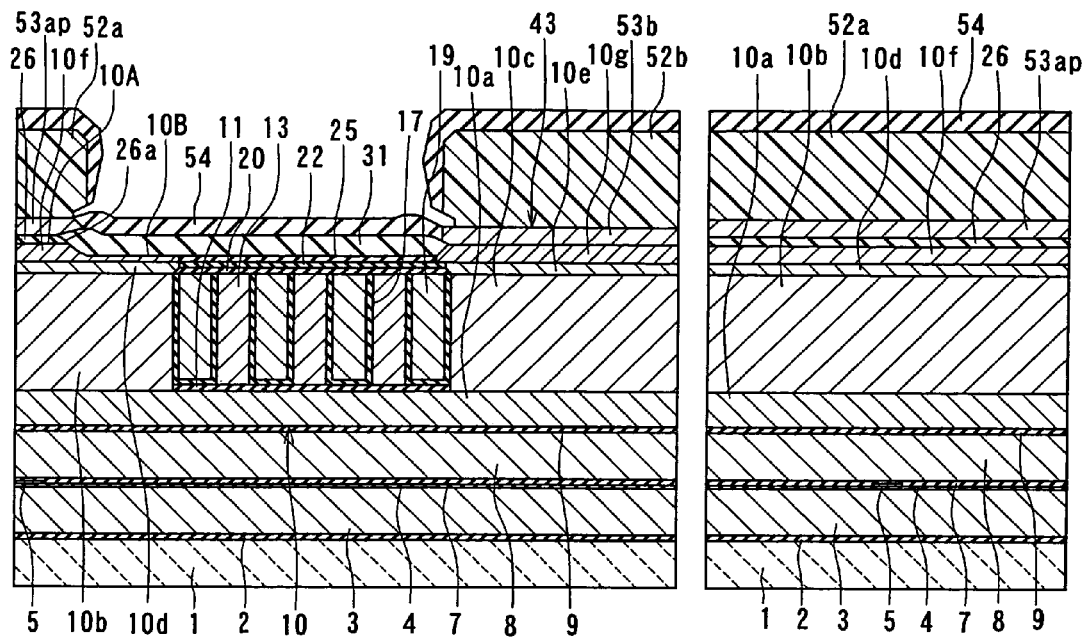
FIG. 24A and FIG. 24B are cross-sectional views for illustrating a step that follows FIG. 23A and FIG. 23B.

FIG. 24A and FIG. 24B illustrate the following step. In the step etching masks 52a and 52b are formed on the magnetic layer 50. The etching mask 52a is a mask for forming an end portion of the magnetic layer 50 opposite to the air bearing surface. The mask 52a is disposed above the gap layer 26. The etching mask 52b is disposed above the coupling layer 10g. Each of the etching masks 52a and 52b has an undercut so that the bottom surface is smaller than the top surface in order to facilitate lift-off that will be performed later. Such etching masks 52a and 52b may be formed by patterning a resist layer made up of two stacked organic films, for example.

Next, the magnetic layer 50 is selectively etched by ion beam etching, for example, through the use of the etching masks 52a and 52b. A magnetic layer 53ap and a coupling layer 53b are thereby made up of portions of the magnetic layer 50 remaining under the etching masks 52a and 52b after the etching. The coupling layer 53b is disposed above the coupling layer 10g. The coupling layer 53b together with the coupling layers 10c, 10e and 10g makes up the coupling section 43.

The magnetic layer 53ap is disposed adjacent to the write gap layer 26 and includes an end located in the air bearing surface 42 and the other end located opposite to the air bearing surface 42. At this time the magnetic layer 53ap has a width greater than the write track width.

Next, a nonmagnetic layer 54 made of a nonmagnetic material is formed by lift-off. That is, the nonmagnetic layer 54 having a thickness of 0.2 to 0.3 μm is formed to cover the entire top surface of the layered structure while the etching masks 52a and 52b are left unremoved. The nonmagnetic layer 54 is formed in a self-aligned manner such that the etched portion of the magnetic layer 50 is filled with the nonmagnetic layer 54. The nonmagnetic layer 54 is preferably formed such that the top surface thereof is located in nearly the same level as the top surface of the magnetic layer 53ap. The nonmagnetic layer 54 may be made of an insulating material such as alumina.

Figures 25A, 25B:
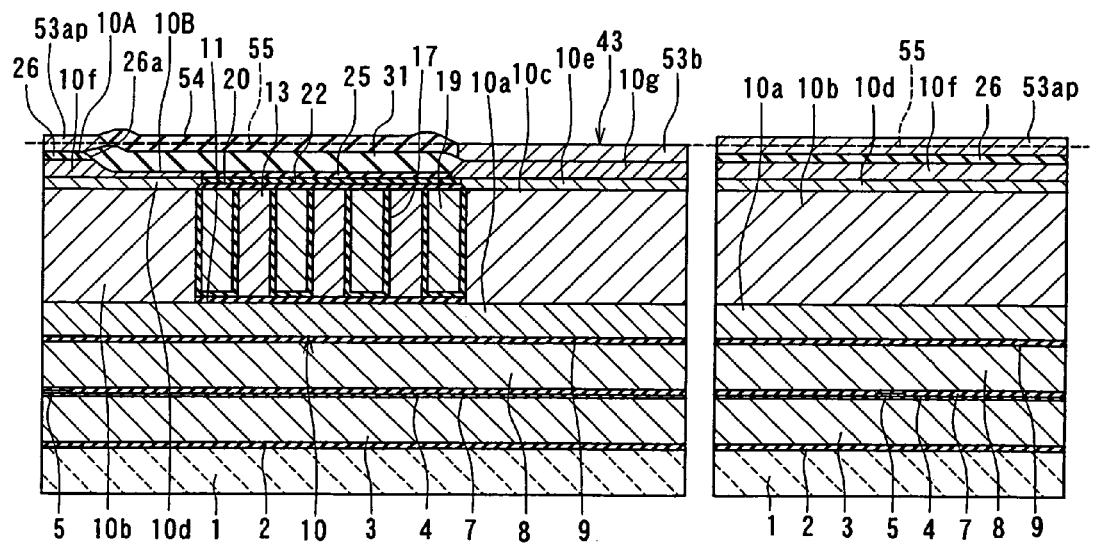
FIG. 25A and FIG. 25B are cross-sectional views for illustrating a step that follows FIG. 24A and FIG. 24B.

FIG. 25A and FIG. 25B illustrate the following step. In the step the etching masks 52a and 52b are lifted off, and the top surfaces of the magnetic layer 53ap, the coupling layer 53b and the nonmagnetic layer 54 are then polished by CMP, for example, and flattened. In FIG. 25A and FIG. 25B numeral 55 indicates the level in which the polishing is stopped. The depth to which the polishing is performed falls within a range of 10 to 50 nm inclusive, for example.

Figures 26A, 26B:
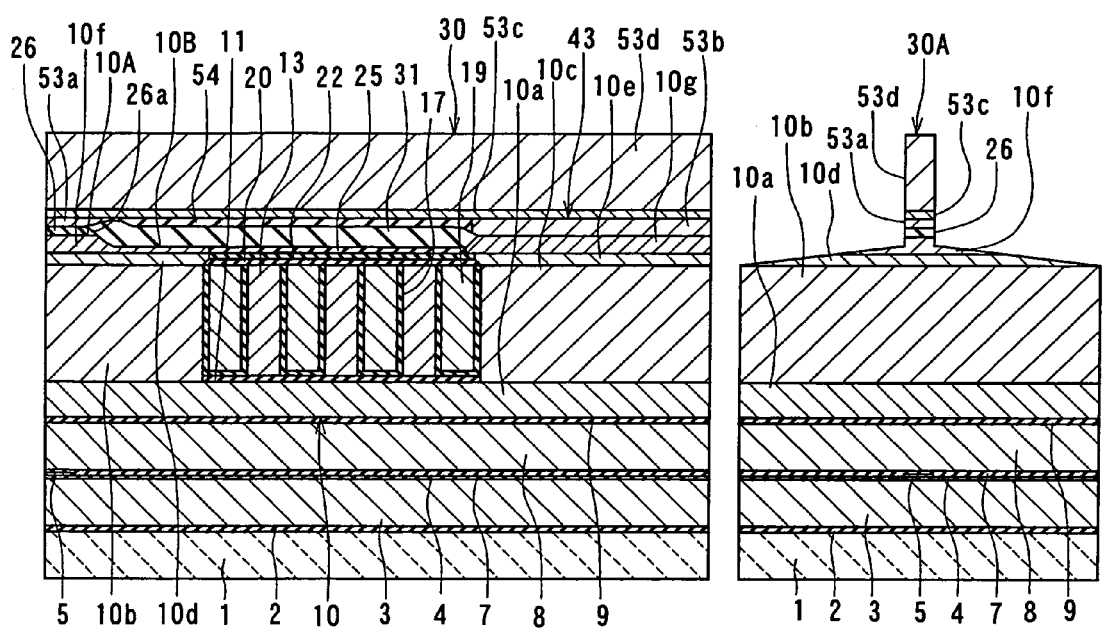
FIG. 26A and FIG. 26B are cross-sectional views for illustrating a step that follows FIG. 25A and FIG. 25B.

FIG. 26A and FIG. 26B illustrate the following step. In the step a magnetic layer made of a magnetic material and having a thickness of 0.1 to 0.3 μm is formed by sputtering, for example, on the entire top surface of the layered structure. The magnetic layer is made of a high saturation flux density material such as CoFeN, FeAlN, FeN, FeCo or FeZrN.

Next, a yoke portion layer 53d made of a magnetic material is formed by frame plating, for example, on the magnetic layer, wherein the magnetic layer is used as an electrode and a seed layer. The yoke portion layer 53d has a thickness of 3 to 4 μm, for example. The yoke portion layer 53d may be made of CoNiFe or FeCo having a saturation flux density of 2.3 T, for example. The yoke portion layer 53d is disposed to extend from a region corresponding to the magnetic layer 53ap to a region corresponding to the coupling layer 53b.

Next, the write gap layer 26, the magnetic layer 53*ap*, and the magnetic layer below the yoke portion layer 53*d* are selectively etched by ion beam etching, for example, using the yoke portion layer 53*d* as an etching mask. The magnetic layer below the yoke portion layer 53*d* thus etched is a yoke portion layer 53*c*. The plane geometry of the yoke portion layer 53*c* is the same as that of the yoke portion layer 53*d*. The magnetic layer 53*ap* thus etched is the magnetic layer 53*a* that corresponds to the first layer of the invention. After the above-mentioned etching is performed, the yoke portion layer 53*d* has a thickness of 1 to 2 μm, for example. The top pole layer 30 is made up of the magnetic layer 53*a*, the coupling layer 53*b*, and the yoke portion layers 53*c* and 53*d*. The top pole layer 30 of the second embodiment has a shape the same as the top pole layer 30 of the first embodiment.

Next, although not shown, a photoresist mask having an opening around the track width defining portion 30A of the top pole layer 30 is formed. Next, as in the first embodiment, a portion of the fourth layer 10*f* is etched by ion beam etching, for example, using the photoresist mask and the track width defining portion 30A as masks. A trim structure is thereby formed, wherein a portion of the fourth layer 10*f*, the write gap layer 26, the magnetic layer 53*a*, and the track width defining portion 30A have the same widths in the air bearing surface.

Next, sidewalls of the portion of the fourth layer 10*f*, the write gap layer 26, the magnetic layer 53*a* and the track width defining portion 30A are etched by ion beam etching, for example, to reduce the widths of these layers in the air bearing surface down to 0.1 μm, for example. This etching may be performed such that the direction in which ion beams move forms an angle in a range of 40 to 75 degrees inclusive with respect to the direction orthogonal to the top surface of the first layer 10*a*.

Figures 27A, 27B:
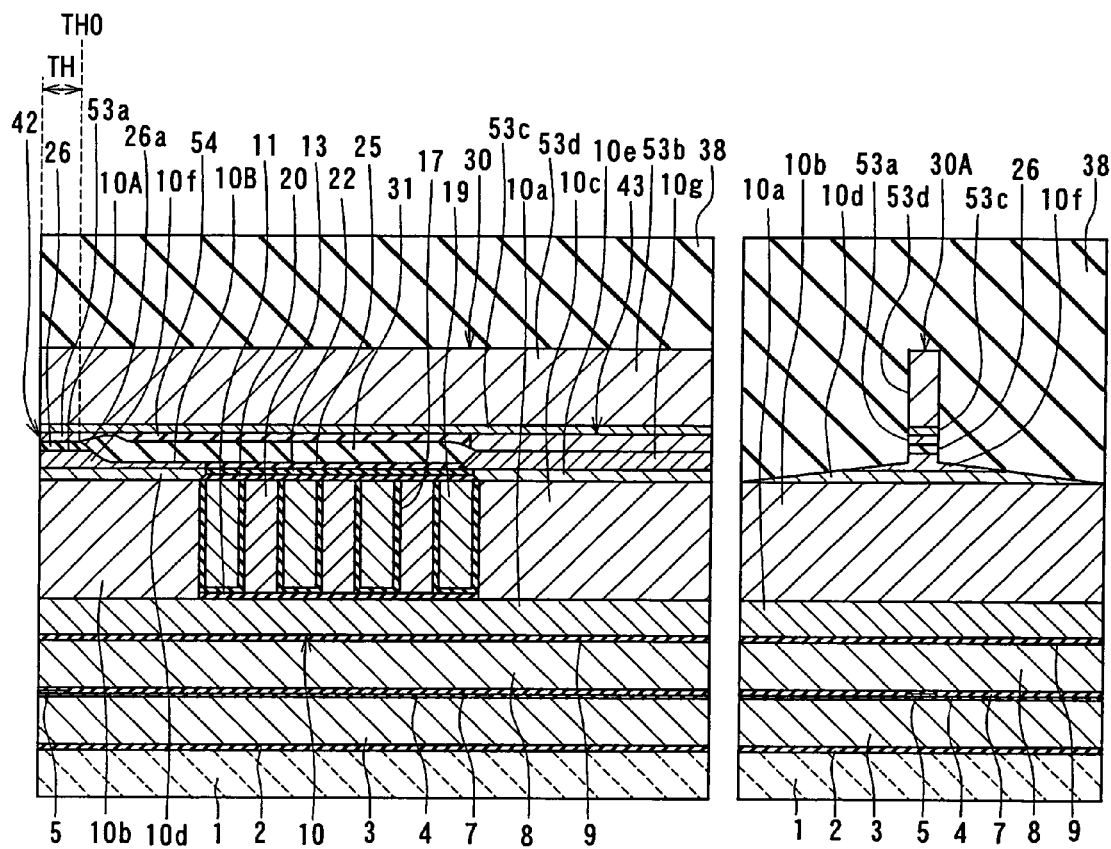
FIG. 27A and FIG. 27B are cross-sectional views for illustrating a step that follows FIG. 26A and FIG. 26B.

FIG. 27A and FIG. 27B illustrate the following step. In the step the overcoat layer 38 made of alumina, for example, and having a thickness of 20 to 30 μm is formed so as to cover the entire top surface of the layered structure. The surface of the overcoat layer 38 is flattened, and electrode pads (not shown) are formed thereon. Finally, the slider including the foregoing layers is lapped to form the air bearing surface 42. The thin-film magnetic head including the read and write heads is thus completed.

According to the embodiment, the throat height is defined by the position in which the end portion 26*a* for defining the throat height in the write gap layer 26 is in contact with the magnetic layer 53*a* of the top pole layer 30. That is, the throat height TH is the distance between the air bearing surface 42 and the position in which the end portion 26*a* is in contact with the magnetic layer 53*a*. The zero throat height level TH0 is the level in which the end portion 26*a* is in contact with the magnetic layer 53*a*. According to the embodiment, the top surface of the write gap layer 26 is not polished, so that there is no variation in throat height caused by polishing even if the surface of the end portion 26*a* is tilted with respect to the direction orthogonal to the top surface of the first layer 10*a*. The throat height is therefore controlled with accuracy, according to the embodiment.

According to the embodiment, the nonmagnetic layer 54 is formed by lift-off to fill the etched portion of the magnetic layer 50. As a result, it is possible to flatten the top surfaces of the magnetic layer 53*a* and the nonmagnetic layer 54 by a small amount of polishing. It is thereby possible to control the thickness of the pole portion of the top pole layer 30 with accuracy. As a result, the writing characteristics of the thin-film magnetic head are easily controlled with accuracy.

If the nonmagnetic layer 54 is formed such that the top surface thereof is located in nearly the same level as the top surface of the magnetic layer 53*ap*, the step of flattening the top surfaces of the magnetic layer 53*ap* and the nonmagnetic layer 54 may be omitted.

The remainder of configuration, function and effects of the second embodiment are similar to those of the first embodiment.

(Third Embodiment)

Reference is now made to FIG. 28A to FIG. 33A and FIG. 28B to FIG. 33B to describe a method of manufacturing a thin-film magnetic head of a third embodiment of the invention. FIG. 28A to FIG. 33A are cross sections orthogonal to the air bearing surface and the top surface of the substrate. FIG. 28B to FIG. 33B are cross sections of the pole portions parallel to the air bearing surface.

The method of manufacturing the thin-film magnetic head of the third embodiment includes the steps up to the step of forming the insulating layer 22 as shown in FIG. 7A and FIG. 7B that are the same as those of the first embodiment.

Figures 28A, 28B:
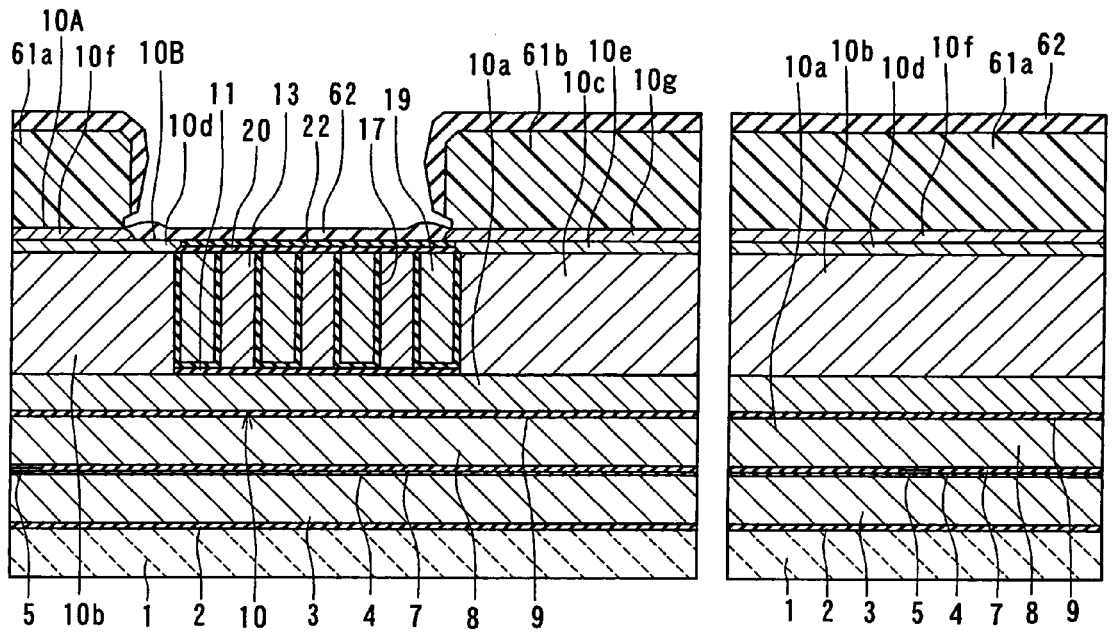
FIG. 28A and FIG. 28B are cross-sectional views for illustrating a step in a method of manufacturing a thin-film magnetic head of a third embodiment of the invention.

FIG. 28A and FIG. 28B illustrate the following step. In the step a magnetic layer made of a magnetic material and having a thickness of 0.3 to 0.5 μm is formed by sputtering, for example, to cover the entire top surface of the layered structure. The magnetic layer may be made of a high saturation flux density material such as CoFeN, FeAlN, FeN, FeCo or FeZrN. In the embodiment the magnetic layer is made of CoFeN having a saturation flux density of 2.4 T by way of example.

Next, an etching mask 61*a* is formed in a portion corresponding to the third layer 10*d* and an etching mask 61*b* is formed in a portion corresponding to the coupling layer 10*e*. Each of the etching masks 61*a* and 61*b* has an undercut so that the bottom surface is smaller than the top surface in order to facilitate lift-off that will be performed later. Such etching masks 61*a* and 61*b* may be formed by patterning a resist layer made up of two stacked organic films, for example.

Next, the magnetic layer is selectively etched by ion beam etching, for example, through the use of the etching masks 61*a* and 61*b*. The fourth layer 10*f* and the coupling layer 10*g* are thereby made up of portions of the magnetic layer remaining under the etching masks 61*a* and 61*b* after the etching, and disposed on the third layer 10*d* and the coupling layer 10*e*, respectively. In the third embodiment the top surface of the fourth layer 10*f* is the first surface 10A, and the top surface of a portion of the third layer 10*d*, the portion being located farther from the air bearing surface 42 than the fourth layer 10*f*, is the second surface 10B.

Next, an insulating layer 62 made of alumina, for example, and having a thickness of 0.4 to 0.6 μm is formed to cover the entire top surface of the layered structure while the etching masks 61*a* and 61*b* are left unremoved. The insulating layer 62 is formed in a self-aligned manner such that the etched portion of the magnetic layer to be the fourth layer 10*f* is filled with the insulating layer 62.

Figures 29A, 29B:
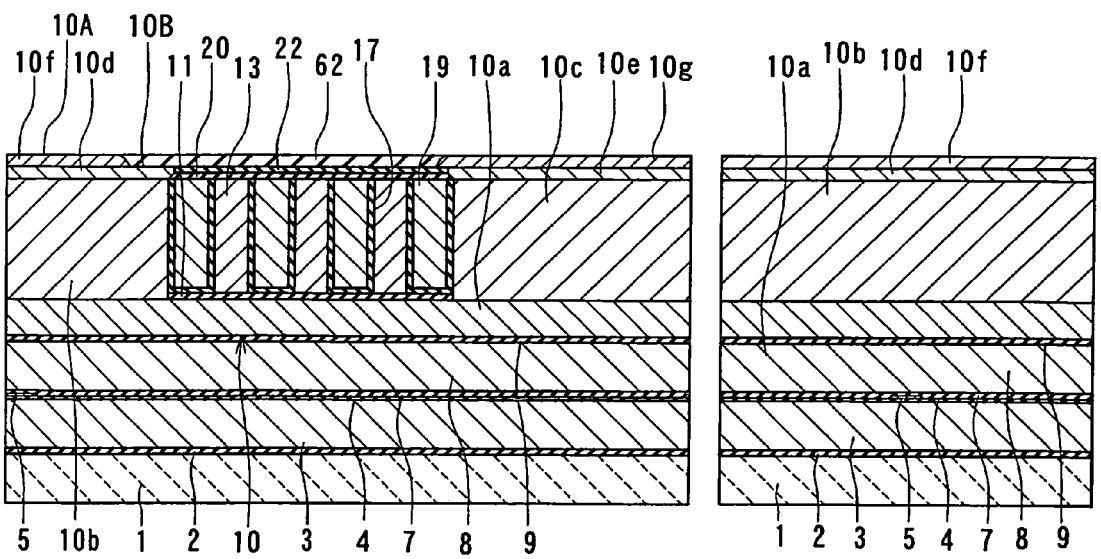
FIG. 29A and FIG. 29B are cross-sectional views for illustrating a step that follows FIG. 28A and FIG. 28B.

FIG. 29A and FIG. 29B illustrate the following step. In the step the etching masks 61*a* and 61*b* are lifted off, and the top surfaces of the fourth layer 10*f*, the coupling layer 10*g* and the insulating layer 62 are then polished by CMP, for example, and flattened. The depth to which the polishing is performed is 10 to 50 nm, for example.

Figures 30A, 30B:
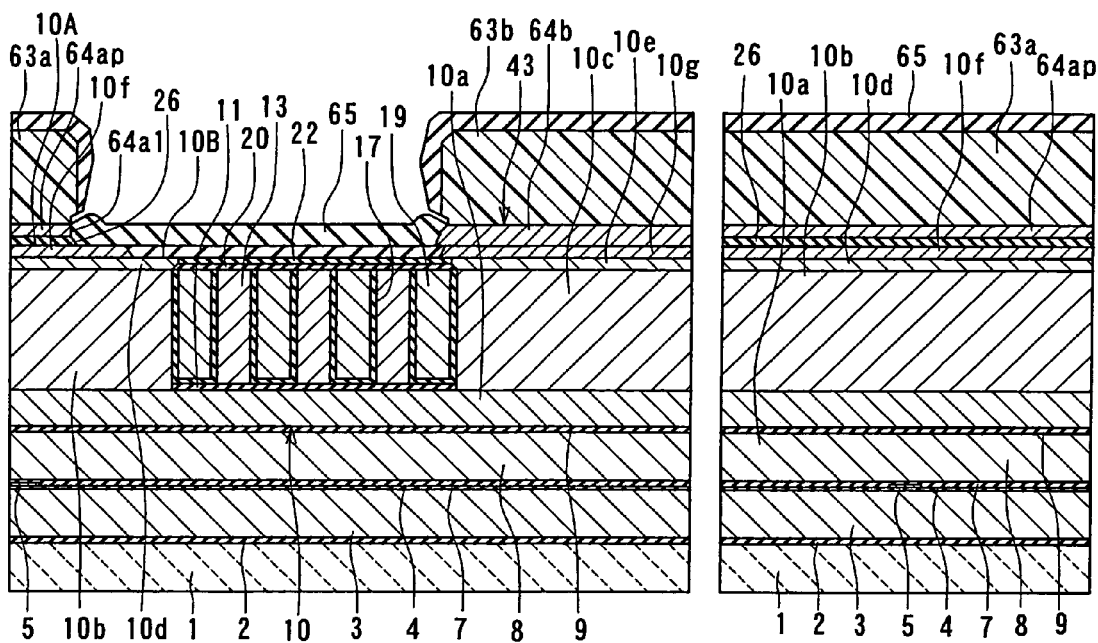
FIG. 30A and FIG. 30B are cross-sectional views for illustrating a step that follows FIG. 29A and FIG. 29B.

FIG. 30A and FIG. 30B illustrate the following step. In the step the write gap layer 26 having a thickness of 0.07 to 0.1 μm is formed to cover the entire top surface of the layered structure. The write gap layer 26 may be made of an insulating material such as alumina or a nonmagnetic metal such as Ru, NiCu, Ta, W or NiB. Next, a portion of the write gap layer 26 corresponding to the coupling layer 10g is selectively etched.

Next, a magnetic layer made of a magnetic material and having a thickness of 0.1 to 0.3 µm is formed by sputtering, for example, to cover the entire top surface of the layered structure. The magnetic layer may be made of a high saturation flux density material such as CoFeN, FeAlN, FeN, FeCo or FeZrN. The magnetic layer preferably has a higher saturation flux density. In the embodiment the magnetic layer is made of CoFeN having a saturation flux density of 2.4 T by way of example.

Next, etching masks 63a and 63b are formed on the above-mentioned magnetic layer. The etching mask 63a is provided for forming an end portion for defining the throat height in the magnetic layer, and is disposed above the fourth layer 10f. The etching mask 63b is disposed above the coupling layer 10g. Each of the etching masks 63a and 63b has an undercut so that the bottom surface is smaller than the top surface in order to facilitate lift-off that will be performed later. Such etching masks 63a and 63b may be formed by patterning a resist layer made up of two stacked organic films, for example.

Next, the magnetic layer and the write gap layer 26 are selectively etched by ion beam etching, for example, using the etching masks 63a and 63b. A magnetic layer 64ap and a coupling layer 64b are made up of portions of the magnetic layer remaining under the masks 63a and 63b after the etching.

The magnetic layer 64ap is disposed adjacent to the write gap layer 26. The magnetic layer 64ap will be patterned to be a throat height defining layer 64a. At this time the magnetic layer 64ap has a width greater than the write track width. The magnetic layer 64ap has an end portion 64a1 for defining the throat height. The coupling layer 64b is disposed on the coupling layer 10g.

Next, a nonmagnetic layer 65 made of a nonmagnetic material is formed by lift-off. That is, the nonmagnetic layer 65 having a thickness of 0.2 to 0.4 µm is formed to cover the entire top surface of the layered structure while the etching masks 63a and 63b are left unremoved. The nonmagnetic layer 65 is formed in a self-aligned manner such that the etched portions of the magnetic layer and the write gap layer 26 are filled with the nonmagnetic layer 65. The nonmagnetic layer 65 is preferably formed such that the top surface thereof is located in nearly the same level as the top surface of the magnetic layer 64ap. The nonmagnetic layer 65 may be made of an insulating material such as alumina.

Figures 31A, 31B:
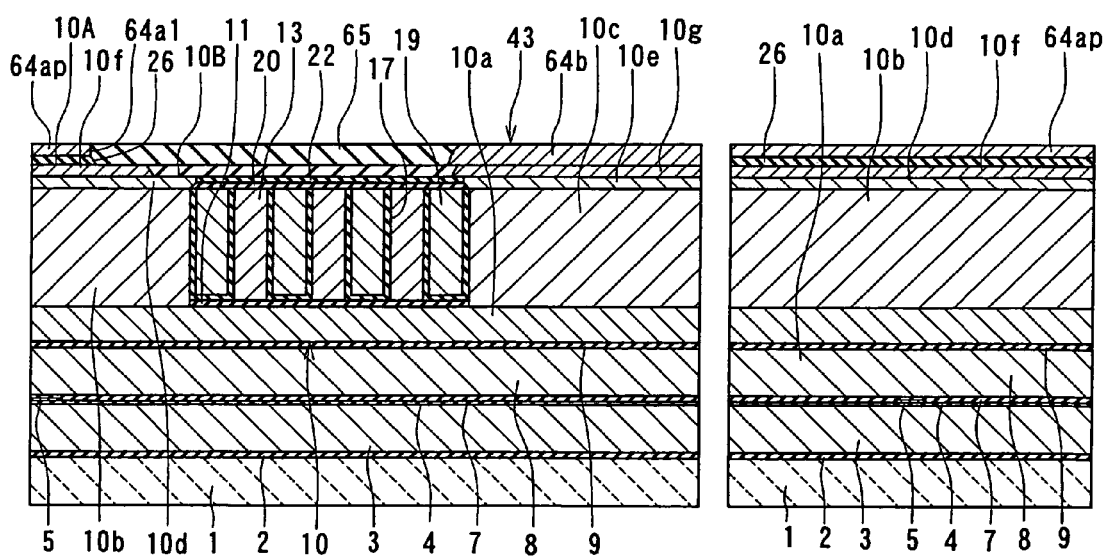
FIG. 31A and FIG. 31B are cross-sectional views for illustrating a step that follows FIG. 30A and FIG. 30B.

FIG. 31A and FIG. 31B illustrate the following step. In the step the etching masks 63a and 63b are lifted off, and the top surfaces of the magnetic layer 64ap, the coupling layer 64b and the nonmagnetic layer 65 are polished by CMP, for example, and flattened. The depth to which the polishing is performed is 10 to 50 nm, for example.

Figure 32A:
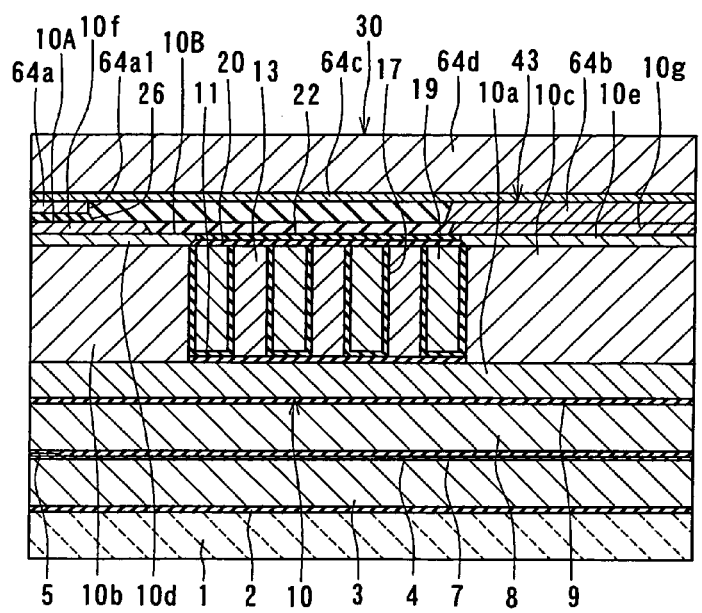
FIG. 32A and FIG. 32B are cross-sectional views for illustrating a step that follows FIG. 31A and FIG. 31B.
Figure 32B:
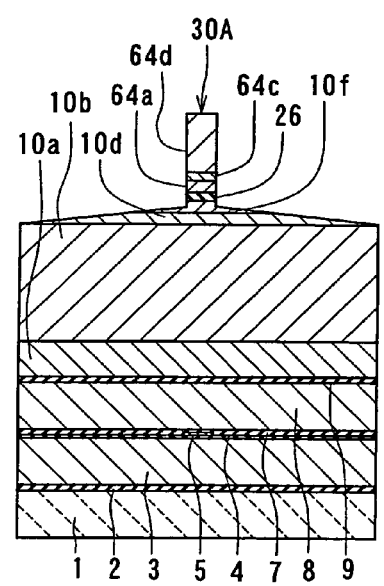

FIG. 32A and FIG. 32B illustrate the following step. In the step a magnetic layer made of a magnetic material and having a thickness of 0.1 to 0.3 µm is formed by sputtering, for example, on the entire top surface of the layered structure. The magnetic layer is made of a high saturation flux density material such as CoFeN, FeAlN, FeN, FeCo or FeZrN.

Next, a yoke portion layer 64d made of a magnetic material is formed by frame plating, for example, on the above-mentioned magnetic layer, wherein the magnetic layer is used as an electrode and a seed layer. The yoke portion layer 64d has a thickness of 3 to 4 µm, for example.

The yoke portion layer 64d may be made of CoNiFe or FeCo having a saturation flux density of 2.3 T, for example. The yoke portion layer 64d is disposed to extend from a region corresponding to the magnetic layer 64ap to a region corresponding to the coupling layer 64b.

Next, the write gap layer 26, the magnetic layer 64ap, and the magnetic layer below the yoke portion layer 64d are selectively etched by ion beam etching, for example, using the yoke portion layer 64d as an etching mask. The magnetic layer below the yoke portion layer 64d thus etched is a yoke portion layer 64c. The plane geometry of the yoke portion layer 64c is the same as that of the yoke portion layer 64d. The magnetic layer 64ap thus etched is a throat height defining layer 64a that corresponds to the first layer of the invention. After the above-mentioned etching is performed, the yoke portion layer 64d has a thickness of 1 to 2 µm, for example. The top pole layer 30 is made up of the throat height defining layer 64a, the coupling layer 64b, and the yoke portion layers 64c and 64d. The top pole layer 30 of the third embodiment has a shape the same as the top pole layer 30 of the first embodiment.

Next, although not shown, a photoresist mask having an opening around the track width defining portion 30A of the top pole layer 30 is formed. Next, as in the first embodiment, a portion of the fourth layer 10f is etched by ion beam etching, for example, using the photoresist mask and the track width defining portion 30A as masks. A trim structure is thereby formed, wherein a portion of the fourth layer 10f, the write gap layer 26, the throat height defining layer 64a, and the track width defining portion 30A have the same widths in the air bearing surface.

Next, sidewalls of the portion of the fourth layer 10f, the write gap layer 26, the throat height defining layer 64a and the track width defining portion 30A are etched by ion beam etching, for example, to reduce the widths of these layers in the air bearing surface down to 0.1 µm, for example. This etching may be performed such that the direction in which ion beams move forms an angle in a range of 40 to 75 degrees inclusive with respect to the direction orthogonal to the top surface of the first layer 10a.

Figures 33A, 33B:
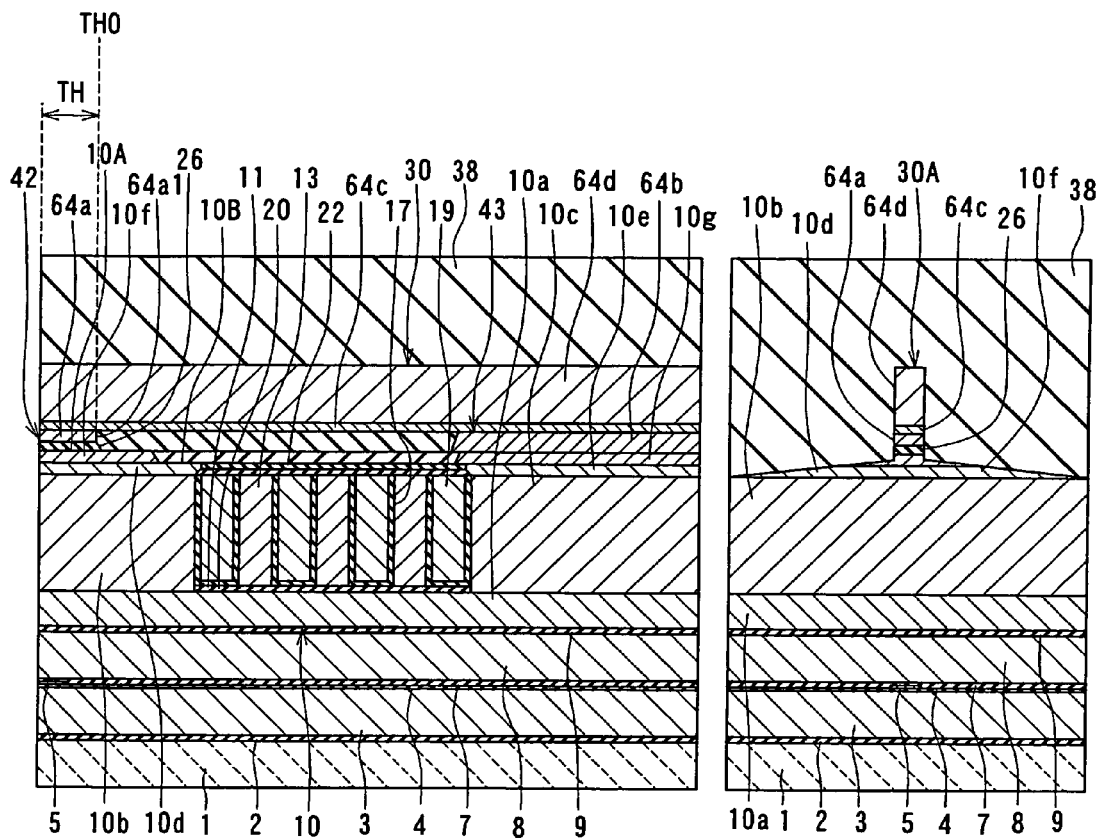
FIG. 33A and FIG. 33B are cross-sectional views for illustrating a step that follows FIG. 32A and FIG. 32B.

FIG. 33A and FIG. 33B illustrate the following step. In the step the overcoat layer 38 made of alumina, for example, and having a thickness of 20 to 30 µm is formed so as to cover the entire top surface of the layered structure. The surface of the overcoat layer 38 is flattened, and electrode pads (not shown) are formed thereon. Finally, the slider including the foregoing layers is lapped to form the air bearing surface 42. The thin-film magnetic head including the read and write heads is thus completed.

According to the embodiment, the throat height is defined by the end portion 64a1 of the throat height defining layer 64a. That is, the throat height TH is the distance between the end portion 64a1 and the air bearing surface. The zero throat height level TH0 is the level in which the end portion 64a1 is located.

According to the embodiment, an end of the first surface 10A opposite to the air bearing surface 42 is located farther from the air bearing surface 42 than the end portion 64a1 of the throat height defining layer 64a. According to the embodiment, it is thereby possible to prevent saturation and leakage of flux halfway through the magnetic path of the bottom pole layer 10. As a result, the overwrite property is improved.

According to the embodiment, the nonmagnetic layer 62 is formed by lift-off to fill the etched portion of the magnetic layer to be the fourth layer 10f. As a result, it is possible to flatten the top surfaces of the fourth layer 10f and the nonmagnetic layer 62 by a small amount of polishing. It is thereby possible to control the thickness of the pole portion of the bottom pole layer 10 with accuracy. Similarly, according to the embodiment, the nonmagnetic layer 65 is formed by lift-off to fill the etched portions of the throat height defining layer 64a and the write gap layer 26. As a result, it is possible to flatten the top surfaces of the throat height defining layer 64a and the nonmagnetic layer 65 by a small amount of polishing. It is thereby possible to control the thickness of the throat height defining layer 64a with accuracy. According to the embodiment, these features make it possible to control the thickness of each of the bottom pole layer 10 and the top pole layer 30 exposed from the air bearing surface 42 with accuracy. As a result, the writing characteristics of the thin-film magnetic head are easily controlled with accuracy. If the nonmagnetic layer 62 is formed such that the top surface thereof is located in nearly the same level as the top surface of the fourth layer 10f, the step of flattening the top surfaces of the fourth layer 10f and the nonmagnetic layer 62 by polishing may be omitted. Similarly, if the nonmagnetic layer 65 is formed such that the top surface thereof is located in nearly the same level as the top surface of the throat height defining layer 64a, the step of flattening the top surfaces of the magnetic layer 64ap and the nonmagnetic layer 65 by polishing may be omitted.

The remainder of configuration, function and effects of the third embodiment are similar to those of the first embodiment.

The present invention is not limited to the foregoing embodiments but may be practiced in still other ways. For example, although the throat height is defined by the stepped portion formed in the surface of the top pole layer 30 closer to the write gap layer 26 in the embodiments, the throat height may be defined by a stepped portion formed in the surface of the bottom pole layer 10 closer to the write gap layer 26.

According to the embodiment, the thin-film coil incorporating the coils 13 and 19 and the connecting layer 21 is provided. However, the thin-film coil of the invention is not limited to this coil but may be a typical thin-film coil made up of a flat whorl-shaped coil having one layer or more.

The invention is also applicable to a thin-film magnetic head dedicated to writing that has an induction-type electromagnetic transducer only, or a thin-film magnetic head that performs writing and reading with an induction-type electromagnetic transducer.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head comprising:
   a medium facing surface that faces toward a recording medium;
   a first pole layer and a second pole layer that are magnetically coupled to each other and include magnetic pole portions opposed to each other and located in regions of the pole layers on a side of the medium facing surface;
   a gap layer provided between the pole portion of the first pole layer and the pole portion of the second pole layer; and
   a thin-film coil, at least part of the coil being disposed between the first and second pole layers and insulated from the first and second pole layers, wherein:

the first pole layer has a surface facing toward the gap layer, the surface incorporating a first surface including an end portion located in the medium facing surface and an end portion located opposite to the medium facing surface, and a second surface located away from the medium facing surface, the first surface being adjacent to the gap layer, a difference in level being created between the first surface and the second surface, so that the second surface is located farther from the second pole layer than the first surface;
   the second pole layer incorporates: a first layer disposed adjacent to the gap layer and including an end portion located in the medium facing surface and an end portion located opposite to the medium facing surface; and a second layer disposed on a side of the first layer opposite to the gap layer and including a track width defining portion for defining a track width;
   each of the first layer and the second layer has a width taken in the medium facing surface that is equal to the track width; and
   a length of the second layer is greater than a length of the first layer, each of the lengths being taken in a direction orthogonal to the medium facing surface, the method comprising the steps of:
   forming the first pole layer;
   forming the thin-film coil on the first pole layer;
   forming the gap layer on the pole portion of the first pole layer; and
   forming the second pole layer on the gap layer, the step of forming the second pole layer including the steps of:
   forming a magnetic layer for forming the first layer on the gap layer;
   forming the second layer on the magnetic layer; and
   etching the magnetic layer to align with a width of the track width defining portion, so that the magnetic layer is formed into the first layer and that the width of each of the first layer and the second layer taken in the medium facing surface is made equal to the track width.

2. The method according to claim 1, wherein the step of etching the magnetic layer further includes etching of the gap layer and a portion of the first pole layer to align with the width of the track width defining portion.

3. The method according to claim 1, wherein the second layer is made to be a flat layer.

4. The method according to claim 1, wherein:
   the gap layer is made of a nonmagnetic inorganic material; and
   the first layer is etched by reactive ion etching in the step of etching the first layer.

5. The method according to claim 4, wherein the nonmagnetic inorganic material is one of the group consisting of alumina, silicon carbide and aluminum nitride.

6. The method according to claim 1, wherein:
   the second pole layer further comprises an intermediate layer disposed between the first layer and the second layer, the intermediate layer having a width taken in the medium facing surface that is equal to the track width, the intermediate layer having a length taken in the direction orthogonal to the medium facing surface that is greater than the length of the first layer and smaller than the length of the second layer, the step of forming the second pole layer including the steps of:
   forming a first magnetic layer for forming the first layer on the gap layer;
   forming a first mask on the first magnetic layer for forming an end portion of the first magnetic layer opposite to the medium facing surface;

forming the end portion of the first magnetic layer and forming the first surface and the second surface of the first pole layer by selectively etching the first magnetic layer, the gap layer and the first pole layer through the use of the first mask;

forming a first nonmagnetic layer so as to fill etched portions of the first magnetic layer, the gap layer and the first pole layer while the first mask is left unremoved;

removing the first mask after the first nonmagnetic layer is formed;

forming a second magnetic layer for forming the intermediate layer on the first magnetic layer and the first nonmagnetic layer after the first mask is removed;

forming a second mask on the second magnetic layer for forming an end portion of the second magnetic layer opposite to the medium facing surface;

forming the end portion of the second magnetic layer by selectively etching the second magnetic layer through the use of the second mask;

forming a second nonmagnetic layer so as to fill an etched portion of the second magnetic layer while the second mask is left unremoved;

removing the second mask after the second nonmagnetic layer is formed;

forming the second layer on the second magnetic layer and the second nonmagnetic layer after the second mask is removed; and etching the second magnetic layer and the first magnetic layer to align with the width of the track width defining portion, so that the first magnetic layer is formed into the first layer, the second magnetic layer is formed into the intermediate layer, and the width of each of the first layer, the intermediate layer and the second layer that is taken in the medium facing surface is made equal to the track width.

7. The method according to claim 6, wherein the throat height is defined by the end portion of the first layer opposite to the medium facing surface.

8. The method according to claim 6, wherein the step of forming the second pole layer further includes the step of flattening top surfaces of the first magnetic layer and the first nonmagnetic layer by polishing, the step of flattening being provided between the step of removing the first mask and the step of forming the second magnetic layer.

9. The method according to claim 8, wherein a depth to which the polishing is performed in the step of flattening the top surfaces of the first magnetic layer and the first nonmagnetic layer falls within a range of 10 to 50 nm inclusive.

10. The method according to claim 6, wherein the step of forming the second pole layer further includes the step of flattening top surfaces of the second magnetic layer and the second nonmagnetic layer by polishing, the step of flattening being provided between the step of removing the second mask and the step of forming the second layer.

11. The method according to claim 10, wherein a depth to which the polishing is performed in the step of flattening the top surfaces of the second magnetic layer and the second nonmagnetic layer falls within a range of 10 to 50 nm inclusive.

12. The method according to claim 1, wherein:

the step of forming the first pole layer includes the steps of:

forming a first mask for forming the first surface and the second surface of the first pole layer on the gap layer;

forming the first surface and the second surface by selectively etching the gap layer and a portion of the first pole layer through the use of the first mask;

forming a first nonmagnetic layer so as to fill etched portions of the gap layer and the first pole layer while the first mask is left unremoved; and removing the first mask after the first nonmagnetic layer is formed; and the step of forming the second pole layer includes the steps of:

forming a magnetic layer for forming the first layer on the gap layer and the first nonmagnetic layer after the first mask is removed;

forming a second mask on the magnetic layer for forming an end portion of the magnetic layer opposite to the medium facing surface;

forming the end portion of the magnetic layer by selectively etching the magnetic layer through the use of the second mask;

forming a second nonmagnetic layer so as to fill an etched portion of the magnetic layer while the second mask is left unremoved;

removing the second mask after the second nonmagnetic layer is formed;

forming the second layer on the magnetic layer and the second nonmagnetic layer after the second mask is removed; and etching the magnetic layer to align with the width of the track width defining portion, so that the magnetic layer is formed into the first layer and that the width of each of the first layer and the second layer that is taken in the medium facing surface is made equal to the track width.

13. The method according to claim 12, wherein;

an end portion of the gap layer opposite to the medium facing surface is formed by the etching of the gap layer; and the throat height is defined by a position in which the end portion of the gap layer is in contact with the first magnetic layer.

14. The method according to claim 12, wherein the step of forming the second pole layer further includes the step of flattening a top surface of the magnetic layer by polishing before the second mask is formed on the magnetic layer.

15. The method according to claim 14, wherein a depth to which the polishing is performed in the step of flattening the top surface of the magnetic layer falls within a range of 10 to 50 nm inclusive.

16. The method according to claim 12, wherein the step of forming the second pole layer further includes the step of flattening top surfaces of the magnetic layer and the second nonmagnetic layer by polishing, the step of flattening being provided between the step of removing the second mask and the step of forming the second layer.

17. The method according to claim 16, wherein a depth to which the polishing is performed in the step of flattening the top surfaces of the magnetic layer and the second nonmagnetic layer falls within a range of 10 to 50 nm inclusive.

18. The method according to claim 1, wherein:

the step of forming the first pole layer includes the steps of:

forming a first mask for forming the first surface and the second surface of the first pole layer on the first pole layer;

forming the first surface and the second surface by selectively etching a portion of the first pole layer through the use of the first mask;

forming a first nonmagnetic layer so as to fill an etched portion of the first pole layer while the first mask is left unremoved; and removing the first mask after the first nonmagnetic layer is formed; and the step of forming the second pole layer includes the steps of:

forming a magnetic layer for forming the first layer on the gap layer;

forming a second mask on the magnetic layer for forming an end portion of the magnetic layer opposite to the medium facing surface;

forming the end portion of the magnetic layer by selectively etching the magnetic layer through the use of the second mask;

forming a second nonmagnetic layer so as to fill an etched portion of the magnetic layer while the second mask is left unremoved;

removing the second mask after the second nonmagnetic layer is formed;

forming the second layer on the magnetic layer and the second nonmagnetic layer after the second mask is removed; and etching the magnetic layer to align with the width of the track width defining portion, so that the magnetic layer is formed into the first layer and that the width of each of the first layer and the second layer that is taken in the medium facing surface is made equal to the track width.

19. The method according to claim 18, wherein:

the throat height is defined by the end portion of the first layer opposite to the medium facing surface; and the end portion of the first surface of the first pole layer opposite to the medium facing surface is located farther from the medium facing surface than the end portion of the first layer opposite to the medium facing surface.

20. The method according to claim 18, wherein the step of forming the first pole layer further includes the step of flattening top surfaces of the first pole layer and the first nonmagnetic layer by polishing after the first mask is removed.

21. The method according to claim 20, wherein a depth to which the polishing is performed in the step of flattening the top surfaces of the first pole layer and the first nonmagnetic layer falls within a range of 10 to 50 nm inclusive.

22. The method according to claim 18, wherein the step of forming the second pole layer further includes the step of flattening top surfaces of the magnetic layer and the second nonmagnetic layer by polishing, the step of flattening being provided between the step of removing the second mask and the step of forming the second layer.

23. The method according to claim 22, wherein a depth to which the polishing is performed in the step of flattening the top surfaces of the magnetic layer and the second nonmagnetic layer falls within a range of 10 to 50 nm inclusive.

* * * * *